US010540417B2

(12) United States Patent
De Coninck Owe

(10) Patent No.: US 10,540,417 B2
(45) Date of Patent: *Jan. 21, 2020

(54) DETERMINING WEB PAGE PROCESSING STATE

(71) Applicant: KAPOW TECHNOLOGIES, Horsholm (DK)

(72) Inventor: Benjamin De Coninck Owe, Copenhagen (DK)

(73) Assignee: KAPOW TECHNOLOGIES, Horsholm (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,055

(22) Filed: Jun. 6, 2019

(65) Prior Publication Data

US 2019/0286681 A1 Sep. 19, 2019

Related U.S. Application Data

(63) Continuation of application No. 15/112,678, filed as application No. PCT/EP2014/073432 on Oct. 31, 2014, now Pat. No. 10,380,215.

(30) Foreign Application Priority Data

Nov. 1, 2013 (DK) .................................. 2013 70639

(51) Int. Cl.
*G06F 9/44* (2018.01)
*G06F 16/957* (2019.01)
*G06F 9/48* (2006.01)
*G06F 9/54* (2006.01)
*G06F 16/958* (2019.01)

(52) U.S. Cl.
CPC ........ *G06F 16/9574* (2019.01); *G06F 9/4887* (2013.01); *G06F 9/548* (2013.01); *G06F 16/958* (2019.01)

(58) Field of Classification Search
CPC ...................................................... G06F 9/44
See application file for complete search history.

(56) References Cited

U.S. PATENT DOCUMENTS

| 2004/0254979 A1* | 12/2004 | Colling ................. G06F 16/957 709/203 |
| 2008/0090165 A1* | 4/2008 | Yamada ............... G03G 9/0804 430/109.4 |
| 2008/0209338 A1* | 8/2008 | Li ......................... G06F 3/0481 715/745 |

* cited by examiner

*Primary Examiner* — Jae U Jeon
(74) *Attorney, Agent, or Firm* — Zilka-Kotab, P.C.

(57) ABSTRACT

A method includes setting one or more parameters in a state determiner, each of the one or more parameters being based at least in part on one or more predefined processing events related to one or more queued processing tasks; determining a web page processing state of a browser based at least in part on the one or more parameters in accordance with one or more predefined criteria; and during processing of a web page by means of the browser: tracing predefined processing events that may cause creation of queued processing tasks with associated delays; invoking a delay converter to change the delays by one or more of absolute decrements, relative decrements and proportional decrements; and reducing a time that the start of execution of the one or more queued processing tasks are set to be delayed by the source code of the web page.

17 Claims, 10 Drawing Sheets

DETERMINING WEB PAGE PROCESSING STATE

FIELD OF THE INVENTION

The presently disclosed inventive concept(s) relate to web browsers and browsing of web pages, more specifically to determining a browser's processing state.

BACKGROUND OF THE INVENTION

Loading and processing a web page is becoming increasingly complicated, unpredictable and even never-ending. In the conventional approach, a single HTML-document often constitutes a complete web page, and browsers only need to load, parse and render this single document. When a browser reaches the concluding </HTML>-tag, processing is complete, and the browser may then complete or remove its progress bar indicator, indicating to a user that the page finished loading and is ready for interaction. Even when conventional approaches employ sub resources such as, e.g., images referred to in the main resource (e.g. the HTML-document), these are loaded, parsed and rendered upon discovery of the sub resources by the typical browser. Moreover, in conventional systems this loading is performed all within the single-string, sequential, synchronous processing of the web page source information (e.g. the HTML-document).

Since then, several other kinds of sub resources have emerged, including scripts and cascading style sheets (CSS). These and other modern web page elements enable a web designer to make use of asynchronous or deferred processing, meaning that even when the browser has reached the end of the main resource, and parsed and rendered all loaded sub resources, it may continue processing the web page. Deferred or timed scripts and CSS transitions may still be in queue for processing, timers may not have fired yet or be in the midst of a repeating loop, etc. It has accordingly become very common for conventional websites to keep scripts or other asynchronous tasks running as long as the web page is shown in a browser window, e.g. for updating content on the website dynamically.

Some deferred or asynchronous tasks may change the semantics of the web page, i.e. the content, e.g. news updates, or the presentation of content, e.g. order, visibility, emphasis, etc., thus triggering a new rendering of the web-page and precipitating a change perceivable by the user. Also, some deferred or asynchronous tasks may be intended by the web designer and/or perceived by a human user as part of the loading and/or initialization (e.g. during a first processing iteration) of the web page, whereas other deferred tasks would be experienced as operational processes for enhancing the experience of exploring or using the web page.

These circumstances make determining when a browser has finished processing a web page practically impossible according to conventional techniques. Even the progress bars or other "busy"-indications of the typical browsers often do not correspond to a user's perception or idea of when a web page rendering is in such a state of completeness that the user can assume the expected information to be present or begin interacting with the web page.

Programmatically seen, for example from a web crawler or other robot's view, the need to be able to determine when to consider the semantics of the page complete or when to proceed forward with automatic interaction is very important. Web robots or automated browsing scripts have far less sense or feeling of when the web page is ready, and what operational tasks to disregard, than a human user has.

The common solution to the problem has been to make robots, scripts, etc., simply wait a predefined amount of time before proceeding. This is not a very efficient way of determining when a browser is done, as there is very large variation in how long it takes for the browser to become ready. Thus, there is often unnecessary waiting, or alternatively, insufficient waiting. Furthermore, it is tedious for the programmer writing the automation script or robot to have to guess the necessary or relevant amount of time for each task.

Using pauses of predetermined length also disregards the fact that the time for performing a given action on a specific website is not constant, but depending on the user client software and hardware, network latencies, etc. Depending on the acceptable fault rate, the web robot may be held waiting for periods in the amount of e.g. 5-10 seconds, or even longer, amounting to, e.g., 1 minute, if a high probability that the browser actually having finished processing during the waiting is desired.

Accordingly, it would be beneficial to provide systems, techniques, and computer program products configured to perform improved, efficient, and adaptive ways of determining a web page processing state.

SUMMARY OF THE INVENTION

The inventors have identified the above-mentioned problems and difficulties in prior art browsers and automated browsing, and have invented relevant solutions as described in the following.

In one embodiment, a method includes, setting one or more parameters in a state determiner, each of the one or more parameters being based at least in part on one or more predefined processing events related to one or more queued processing tasks; determining a web page processing state of a browser based at least in part on the one or more parameters in accordance with one or more predefined criteria; and during processing of a web page by means of the browser: tracing predefined processing events that may cause creation of queued processing tasks with associated delays; invoking a delay converter to change the delays by one or more of absolute decrements, relative decrements and proportional decrements; and reducing a time that the start of execution of the one or more queued processing tasks are set to be delayed by the source code of the web page.

In another embodiment, a computer program product includes computer readable instructions for execution by a computer for: setting one or more parameters in a state determiner, each of the one or more parameters being based at least in part on one or more predefined processing events related to one or more queued processing tasks; determining a web page processing state of a browser based at least in part on the one or more parameters in accordance with one or more predefined criteria; and during processing of a web page by means of the browser: tracing predefined processing events that may cause creation of queued processing tasks with associated delays; invoking a delay converter to change the delays by one or more of absolute decrements, relative decrements and proportional decrements; and reducing a time that the start of execution of the one or more queued processing tasks are set to be delayed by the source code of the web page.

In yet another embodiment, a system includes a processing unit and a memory unit, the memory unit comprising computer readable instructions configured to cause the system, upon execution thereof, to: set one or more parameters in a state determiner, each of the one or more parameters being based at least in part on one or more predefined processing events related to one or more queued processing tasks; determine a web page processing state of a browser based at least in part on the one or more parameters in accordance with one or more predefined criteria; and during processing of a web page by means of the browser: trace predefined processing events that may cause creation of queued processing tasks (QPT) with associated delays; invoke a delay converter (DC) to change the delays by one or more of absolute decrements, relative decrements and proportional decrements; and reduce a time that the start of execution of the one or more queued processing tasks are set to be delayed by the source code of the web page.

Of course, the foregoing examples are merely illustrative and should not be considered limiting on the scope of the presently disclosed inventive concepts. Rather, any combination, modification, permutation, or synthesis of the inventive concepts disclosed herein that would be appreciated by a skilled artisan upon reading these descriptions is to be considered within the scope of this disclosure. Additional embodiments, examples, etc. will be discussed in further detail below.

BRIEF DESCRIPTION OF THE DRAWINGS

The presently disclosed inventive concepts will in the following be described with reference to the drawings.

DETAILED DESCRIPTION

Figure 1:
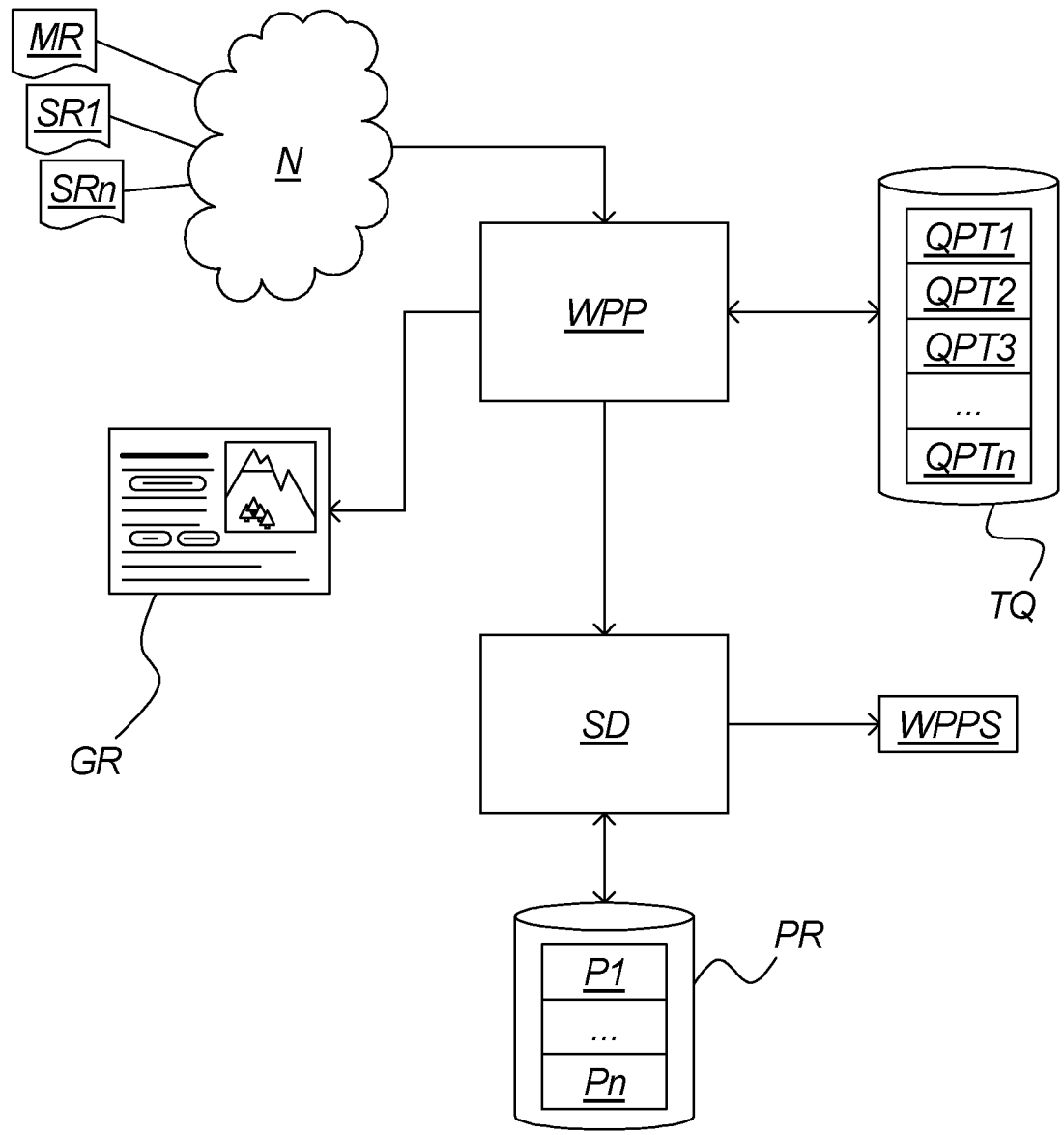
FIG. 1 illustrates one embodiment of the presently disclosed inventive concepts with a state determiner.

An embodiment relates to a method comprising: setting one or more parameters P1 . . . Pn in a state determiner SD, each of the one or more parameters being based at least in part on one or more predefined processing events related to one or more queued processing tasks QPT; determining a web page processing state WPPS of a browser (WB) based at least in part on the said one or more parameters P1 . . . Pn in accordance with one or more predefined criteria.

An improved, efficient, and adaptive way of determining a web page processing state, e.g. whether or not the web page is sufficiently processed to comprise expected information or be ready for interaction, is hereby provided. In various preferred embodiments, the method is preferably a computer implemented method carried out during a processing of a web page using a browser, and/or the web page processing state WPPS is preferably determined by the state determiner.

The method solves several problems and challenges related to the prior art. First of all, the above-described embodiment is usually much faster than the common way of simply waiting a predetermined time and often even a very long time to be safe. The method disclosed here determines when it would be safe to proceed based on the actually happening processing events, thereby making it possible to proceed as soon as the event-related criteria are fulfilled.

When the processing of a web page goes smoothly the method described herein typically cuts off a lot, e.g. from about 25% to about 50% or even more, of the waiting time that would have been required by typical prior automation systems, by being able to determine a state of readiness before the prior art fixed waiting time would have elapsed. If the processing in a certain situation is less smooth, e.g. due to network latencies, the method may use a comparable amount of time or even longer time to proceed than prior systems with predetermined waiting time, but will in that case wait for the web page to finish processing or attain a predefined degree of readiness or completion.

Thereby is provided a more reliable result because the determined web page processing state reflects the actual processing, and the same result, i.e. determined state in relation to actual processing, can therefore be expected another time the same web page is processed. The prior art system, on the other hand, will in the case of, e.g., non-smooth download, simply proceed when the predetermined waiting time is up, regardless of the processing state of the browser at that time. As a result, the prior art techniques frequently proceed (or attempt to proceed with fatal results) from one state to another unreliably—e.g. before requisite elements of a web page have completed loading.

If, in an exemplary prior art technique is used a relatively short waiting time, e.g. 5 seconds, it is at the expense of certainty, e.g. in this example by proceeding too early 50% of the time. The present method may only reduce the waiting time relatively little, e.g. 0-10%, but on the other hand provide a very high degree of certainty that processing has actually finished, thereby proceed at the correct time close to 100% of the time.

In a different exemplary prior art technique may be selected an, e.g., 70% longer waiting time of, e.g., 8.5 seconds, which, with the same fault probabilities as in the above example, causes the prior art technique to proceed too early only 1% of the time (which is still a lot for many web robot applications!). The present method may in this example therefore reduce the waiting time significantly, about 41%, and still provide the same absolute certainty of only proceeding when ready every time, of course subject to unrecoverable loading errors like non-responsive web-servers, etc.

A further advantage of the presently disclosed inventive concepts over prior art techniques using a predetermined waiting time is that the web page processing state presently disclosed will attain the same value at the same point in the processing queue each time, even in different instances and under different circumstances, provided the processing steps are the same, because it is determined from actually happening processing events and corresponding criteria. Hence, reliability and predictability is improved over the predetermined waiting time systems who simply shifts their state when time is up, thereby risking that an automated browsing script arrive at different results if processing has reached different points when the waiting time is up in two different instances.

Moreover, the disclosed method automatically adapts to different web pages and actions to a degree limited only by the predefined criteria and supported processing events in a particular implementation, as contrary to a predetermined waiting time system where the predetermined waiting time is either equal for all web pages and actions, or has to be set individually for each relevant web page and action beforehand by cumbersome, manual consideration by a user.

The herein disclosed method also solves problems related to simply considering the ending of the processing of the main resource and synchronous tasks as the conclusion of relevant processing. By basing the web page processing state on events related to queued processing tasks, it is ensured that asynchronous, deferred or timed tasks are also taken into consideration and exposed to the predefined criteria, which would typically not be the case if simply deciding upon completion of the main resource processing. This makes the present method more reliable in general because the web page processing state provided by the present disclosure may continue to reflect the actual state even after the end of main resource processing has been reached, and also more adaptive to different web pages and actions because the web page processing state of the present disclosure may relate to the actually processed events, before and after end of main resource processing, and for synchronous and asynchronous tasks.

Furthermore, the consideration of several processing events, including queued processing events, makes it possible to finely graduate at what processing step a certain web page is considered ready for information extraction or to proceed with the next interaction, for example by choosing the predefined criteria properly. In other words, an automation script writer, e.g. web robot designer, who previously had to let the robot proceed when the main resource was processed or after a predetermined time had elapsed, now by the disclosed method is able to choose at what step in the web page processing he wants the robot to proceed with its next instruction.

In accordance with the herein described method it is noted, that processing events related to queued processing tasks may comprise any event happening during processing of a web page, e.g. performing processing operations such as retrieving, parsing, executing, rendering, etc., as would be understood by one having ordinary skill in the art upon reading the present descriptions. The events listed in Table 1 illustrate several exemplary processing events that may be relevant to monitor and trace, for example because they may relate to queued processing tasks QPT1 . . . QPTn, e.g. by being indicative of, e.g., the creation, execution or removal of a queued processing task.

The queued processing tasks according to one exemplary embodiment of the present descriptions include any task, job, script, instruction, etc., that may be scheduled, timed, deferred, postponed, etc., by a relative, absolute or undefined time for subsequent execution, and particularly such tasks that are executed asynchronously to the processing of the main resource of the web page, i.e. without letting the latter wait for the asynchronous task to complete before proceeding. Of course, alternative and/or equivalent queued processing task types, components, etc. that would be appreciated by one having ordinary skill in the art upon reading the present descriptions may also be employed without departing from the scope of this disclosure.

In more embodiments, particularly involving indicating a state of processing of a web page, the state determiner may determine one or more different values for the web page processing state WPPS. In a simple exemplary embodiment, the web page processing state WPPS may shift between values of "busy" and, e.g., "practically finished", or values of equivalent or similar meaning. The value of "practically finished" or similar may according to an embodiment, for example mean that only queued tasks which will cause no or insignificant semantic changes to the web page remains, and/or that the remaining tasks are repetitions that will probably never end.

In alternative embodiments the web page processing state may have several or many possible values to more or less allow monitoring different stages and degrees of completion as the processing takes place, as described in more detail below.

The parameters P1 . . . Pn, in the state determiner SD advantageously provide information to allow the state determiner to know whether a web page processor WPP is really finished or has reached a certain degree of completeness, and no significant queued processing task QPT remains without having returned, dispatched, executed, etc. A parameter according to the described method may preferably comprise information from the queued processing task or the related processing event that it is based on, e.g. object identification, timing information, state, etc.

A browser according to the method described herein may comprise any mechanisms configured to retrieve a web page, with or without sub resources, and processing the web page, possibly including one or more of executing scripts, performing style sheet transitions, managing timers, etc. The browser preferably comprises at least a web page processor WPP, access to a memory for holding a graphical representation GR of the web page, and a task queue TQ for holding one or more queued processing tasks QPT. The task queue may comprise several registers or buffers for queued processing tasks.

The browser may comprise a conventional, user-operable browser with graphical user interface such as those employed by common commercial browsers, e.g. FIREFOX, CHROME or INTERNET EXPLORER, a headless browser that retrieves and processes web pages but does not provide a graphical user interface, e.g. browsers like GHOST, PHANTOMJS or SPYNNER, or a custom-build browser for example made specifically for browsing by web robots. Currently, browsers based on open source browser engines such as WEBKIT (e.g. the browser SAFARI), GECKO (e.g. the browser FIREFOX) and BLINK (e.g. the browsers CHROME and OPERA) are preferred as they allow for a high degree of customization in terms of instrumenting the browser to set the parameters in the state determiner, or even making the state determiner according to the herein described method a part of a customized browser. Instrumenting, as used herein, may refer to any way of and/or mechanisms to extending functionality by software or hardware to make information available or enable retrieval of information about internal variables, processes, states, etc.

More particularly, in a preferred embodiment, by instrumenting a browser to set parameters in a state determiner, is referred to extending the browser to monitor or allow monitoring events, adding functionality to an event processor in the browser, or hooking up to events in the browser; and using this monitoring or functionality with relation to predefined events to set relevant parameters each time the predefined events occur.

Processing of a web page according to the method described herein refers to any processing from starting the retrieval of a main resource, over the synchronous processing including retrieving and processing sub resources, to managing and executing asynchronous tasks. The processing of the web page may also comprise handling of events and related script execution or retrieval and processing of sub resources initiated by interaction by a user or web robot with the web page, e.g. stemming from links, forms, user interface events like a keystroke, mouseover or mousedown, click, physically interacting with a display (e.g. providing capacitive and/or resistive feedback to a touch-sensitive display), providing audible stimuli (e.g. a voice command, tone), visual stimuli (e.g. displaying a gesture, pose, or symbol), etc., and thus not only when the loading of a new web page is involved.

An advantageous embodiment is obtained when said method comprises a step of tracing said one or more predefined processing events.

According to the described method the tracing of processing events refers to any way of monitoring or otherwise discovering that a predefined processing event fires or has fired. In a preferred embodiment, the browser is instrumented, e.g. as described above, to be able to trace all the processing events that may be relevant for a state determiner according to the method. Tracing the predefined processing events facilitates the setting of parameters in the state determiner accordingly, and thereby the determining of a web page processing state.

An advantageous embodiment is obtained when said tracing said one or more predefined processing events comprises that said setting the one or more parameters in the state determiner is performed in accordance with a predefined processing event occurrence together with related object information.

The state determiner is significantly facilitated in its job of determining the web page processing state when it is able to link together processing events related to the same object, e.g. the installation of a particular timer, the firing of the same timer, and finally the removal of the same timer. In that case, the related object information may be an object id, e.g. the timer id, and preferably also the timer value. By being able to follow "the life", e.g. from creation, over execution, to removal of a task, the state determiner is facilitated in the determining how this task affects the web page processing state, e.g. in terms of being "busy", e.g. when a task exists, i.e. created or executing, but is not completed or removed yet, or having "completed", e.g. as indicated by the task being removed.

An advantageous embodiment is obtained when said one or more queued processing tasks QPT comprise one or more tasks among the tasks of: timer tasks, asynchronous XMLHttpRequest tasks, scheduled redirection tasks, cascading style sheet transition tasks, queued script tasks, and deferred event tasks.

The herein described method is particularly advantageous for determining the web page processing state of a web page causing asynchronous processing, e.g. by means of some of the tasks listed above, as this is where conventional techniques defining end of main resource processing as the overall end of processing as well as conventional techniques relying on a predetermined waiting time both come short, as the asynchronous tasks may proceed after main resource processing ends, and may even go on in endless loops or repetitions, making the predetermined waiting time approach irrelevant.

An advantageous embodiment is obtained when the system is configured to enable a web robot WR to be communicatively coupled to said web page processing state WPPS.

An exceptionally beneficial use of the described method is in connection with web robot browsing, as the waiting time for a web robot can be greatly reduced, as explained above, in the amount of typically 25% to 50% or even more, compared to prior art methods. An example may, e.g., involve reducing a fixed waiting time of 8.5 seconds, with, e.g. 1% fault rate, of a prior art technique, to an average waiting time of 5 seconds, with substantially 0% fault rate, by the present disclosure. By making the web page processing state available to a web robot, e.g. by the web robot being communicatively coupled to the state determiner, is achieved that the web robot may determine when to proceed based on actual and current processing information from the browser, instead of simply waiting for e.g. a fixed, predetermined waiting time.

An advantageous embodiment is obtained when the method further comprises reducing one or more delays associated with one or more of the one or more queued processing tasks QPT.

In order to make the method even further efficient it is beneficial to also reduce some or all delays, e.g. timer values, scheduled redirect times, CSS transition intervals, etc. as would be understood by one having ordinary skill in the art upon reading the present descriptions.

For web robot browsing this combination of reducing delays and determining when the web robot may proceed, is incredibly more efficient than prior art methods.

An advantageous embodiment is obtained when said determining said web page processing state WPPS on the basis of said one or more parameters P1 . . . Pn, comprises considering the relevance to the web page processing state of predefined processing events related to queued processing tasks represented by one or more of the parameters.

The parameters are considered for their relevance e.g. by disregarding parameters representing tasks that have been completely executed, and comparing parameters representing pending or unfinished tasks with the predefined criteria. The history including completed tasks may be taken into account, e.g. to determine when a pending task is actually in a chain of numerous completed tasks, or if it non-related to other tasks.

An advantageous embodiment is obtained when a criteria of said one or more predefined criteria may be used to evaluate one or more of said one or more parameters.

Some criteria may according to the method be relevant for only some kinds of tasks, and therefore some parameters may be relevant to evaluate in the light of many or all criteria, whereas only one or a few criteria may be relevant for the evaluation of other parameters.

An advantageous embodiment is obtained when said one or more predefined criteria comprise one or more criteria among the criteria of: existence of further queued tasks; number of further queued tasks exceeding a threshold; length of a chain of timer events, XMLHttpRequests or other asynchronous tasks exceeding a threshold; duration of no response since dispatch of an XMLHttpRequest exceeding a timeout value; time scheduled for a redirect or refresh of the web page exceeding a threshold; number of repetitions of an interval timer exceeding a threshold; and time set for a timer event exceeding a threshold.

The criteria comprising consideration of a threshold may be evaluated with regard to a single, fixed threshold, or several thresholds may be evaluated to allow for more than two outcomes of the evaluation of a given criteria.

A further embodiment relates to a system comprising a task queue TQ configured to store one or more queued processing tasks QPT during processing of a web page using a browser WB; a state determiner SD comprising a parameter register PR configured to store one or more parameters P1 . . . Pn associated with one or more of said queued processing tasks QPT; one or more predefined criteria; a web page processing state WPPS determined by said state determiner SD on the basis of said one or more parameters P1 . . . Pn in accordance with at least one of said one or more criteria.

An improved, efficient, and adaptive system for establishing a measure of the processing state of a web page in a browser is hereby provided. The elements of the system and its advantages correspond to like features of the above-described method.

An advantageous embodiment is obtained when said browser WB comprises instrumentation configured to trace predefined processing events related to said queued processing tasks QPT.

An advantageous embodiment is obtained when said parameters are associated with occurrences predefined processing events related to said queued processing tasks together with related object information.

An advantageous embodiment is obtained when said queued processing tasks QPT comprise one or more tasks among the tasks of: timer tasks, asynchronous XMLHttpRequest tasks, scheduled redirection tasks, cascading style sheet transition tasks, queued script tasks, and deferred event tasks.

An advantageous embodiment is obtained when the system is configured to enable a web robot WR to be communicatively coupled to said web page processing state WPPS.

As understood herein, elements are "communicatively coupled" when one element is configured to access and/or manipulate the element to which it is recited as "coupled." For example, elements may be configured to invoke, retrieve, refer to, store, recall, etc. the element(s) to which they are communicatively coupled. Of course, other forms of communicative coupling that would be appreciated by a skilled artisan upon reading the present descriptions are also within the scope of these disclosures and may be employed without departing therefrom.

By making the web page processing state available to a web robot is achieved that the web robot may determine when to proceed based on actual and current processing information from the browser, instead of simply waiting for e.g. a fixed, predetermined waiting time.

An advantageous embodiment is obtained when the system further comprises a delay converter DC configured to reduce one or more delays associated with one or more of the queued processing tasks.

A further embodiment relates to a method comprising a web robot (WR) requesting a browser WB to process a web page; setting parameters P1 . . . Pn in a state determiner SD on the basis of predefined processing events related to queued processing tasks QPT established during the browser's processing of the web page; the state determiner SD determining a web page processing state WPPS on the basis of said parameters P1 . . . Pn in accordance with one or more predefined criteria; the web robot retrieving said information after finding that the web page processing state WPPS has reached a predetermined completion value.

According to one embodiment of the presently described methods, the browsing by web robots may be improved compared to conventional techniques, e.g. for amounts as exemplified above, as the web robot, e.g. by being communicatively coupled to the state determiner, may be informed of the browser's processing state, i.e. whether or not desired information is considered available or interaction can start, instead of, e.g., simply wait for a predetermined waiting time. In various preferred embodiments, the method is preferably a computer implemented method.

The information to be retrieved by the web robot may typically comprise some or all of the information that the web page is meant to provide to a user, e.g. news, offers, abstracts, etc., and/or information about links to further web pages, e.g. menus, etc., or possibilities for interacting with the web page, e.g. scripts, event handlers, dynamic style sheet properties, etc., as would be understood by one having ordinary skill in the art upon reading the present descriptions. For example, in one exemplary approach the information may include options to update information, to log in, or other similar secured operations, or to view visually hidden information, all preferably without requiring any reloading of the web page.

An advantageous embodiment is obtained when the method comprises reducing one or more delays associated with one or more of the queued processing tasks.

In order to make the method even further efficient it is beneficial in some approaches to also reduce or even eliminate a duration of some or all delays, e.g. timer values, scheduled redirect times, CSS transition intervals, etc. This combination of reducing delays and determining when the web robot may proceed, is more efficient than prior art methods, as it avoids some or all unnecessary delays but at the same times keeps track of the processing with reference to the actual processing tasks, thereby being facilitated to determine the web page processing state properly, even for different relations between amount of reduced delays and amount of non-reducible processing time.

A further embodiment relates to a system, comprising: a web robot (WR) arranged to retrieve information by means of a browser (WB); a task queue TQ for storing one or more queued processing tasks QPT during processing of a web page requested from the browser by the web robot WR; a state determiner SD comprising a parameter register PR for storing one or more parameters P1 . . . Pn associated with one or more of said queued processing tasks QPT; one or more predefined criteria; a web page processing state WPPS determined by said state determiner SD on the basis of said one or more parameters P1 . . . Pn in accordance with at least one of said one or more criteria; the web page processing state WPPS indicating whether the web robot should retrieve the information from the web page.

An improved, efficient, and adaptive system configured to establish a measure of the processing state of a web page in a browser is hereby provided. The elements of the system and its advantages correspond to like features of the above-described method.

An advantageous embodiment is obtained when the system further comprises a delay converter DC for reducing one or more delays associated with one or more of the queued processing tasks.

A further embodiment relates to a browser WB configured to process a web page, the browser comprising: a task queue TQ configured to store one or more queued processing tasks QPT during processing of a web page; a state determiner SD comprising a parameter register PR configured to store one or more parameters P1 . . . Pn associated with one or more of said queued processing tasks QPT, one or more predefined criteria; and a web page processing state WPPS determined by said state determiner SD on the basis of said one or more parameters P1 . . . Pn in accordance with at least one of said one or more criteria.

A further embodiment relates to a state determiner configured to determine a web page processing state WPPS; the state determiner SD comprising a parameter register PR configured to store one or more parameters P1 . . . Pn associated with one or more queued processing tasks QPT related to a processing of a web page by means of a browser WB; one or more predefined criteria; a web page processing state WPPS determined on the basis of said one or more parameters P1 . . . Pn in accordance with at least one of said one or more criteria.

A further embodiment relates to a computer program product comprising computer readable instructions for execution by a computer for determining a web page processing state WPPS of a browser WB; the computer comprising at least a processing unit, a memory unit and network connectivity; the computer readable instructions comprising first computer readable instructions which when executed causes setting of parameters P1 . . . Pn in a state determiner SD on the basis of predefined processing events related to queued processing tasks QPT; and second computer readable instructions which when executed causes the state determiner SD to determine said web page processing state WPPS on the basis of said parameters P1 . . . Pn in accordance with one or more predefined criteria.

A further embodiment relates to a method comprising, during a processing of a web page by means of a browser WB, reducing a time that the start of execution of a queued processing task QPT is set to be delayed by the source code of the web page.

A beneficial method to reduce some or all delays, e.g. timer values, scheduled redirect times, CSS transition intervals, etc. during processing of a web page is provided. In various preferred embodiments, the method is preferably a computer implemented method. For web robot browsing this is particularly relevant, as most relatively long delays used in web pages are employed to provide a certain experience or visual effects for the user—which is typically irrelevant for web robot users. Hence, by the present method, a reduction of typically 70% to 80%, or even approaching 100%, of this kind of delays may achieved.

In accordance with the herein described method it is noted, that queued processing tasks according to one exemplary embodiment of the present descriptions include any task, job, script, instruction, etc., that may be scheduled, timed, deferred, postponed, etc., by a relative or absolute time for subsequent execution. Of course, alternative and/or equivalent queued processing task types, components, etc. that would be appreciated by one having ordinary skill in the art upon reading the present descriptions may also be employed without departing from the scope of this disclosure. Several of the processing events listed in Table 1 relates, e.g. by being indicative of, e.g., the creation, execution or removal of a queued processing task, to queued processing tasks that in an embodiment may have their execution delayed by purpose.

A browser according to the method described herein may comprise any mechanisms configured to retrieve a web page, with or without sub resources, and processing the web page, possibly including one or more of executing scripts, performing style sheet transitions, managing timers, etc. The browser preferably comprises at least a web page processor WPP, access to a memory for holding a graphical representation GR of the web page, and a task queue TQ for holding one or more queued processing tasks QPT. The task queue may comprise several registers or buffers for queued processing tasks.

The browser may comprise a conventional, user-operable browser with graphical user interface such as those employed by common commercial browsers, e.g. FIREFOX, CHROME or INTERNET EXPLORER, a headless browser that retrieves and processes web pages but does not provide a graphical user interface, e.g. browsers like GHOST, PHANTOMJS or SPYNNER, or a custombuild browser for example made specifically for browsing by web robots. Currently, browsers based on open source browser engines such as WEBKIT (e.g. the browser SAFARI), GECKO (e.g. the browser FIREFOX) and BLINK (e.g. the browsers CHROME and OPERA) are preferred as they allow for a high degree of customization in terms of instrumenting the browser to set the parameters in the state determiner, or even making the state determiner according to the herein described method a part of a customized browser. Instrumenting, as used herein, may refer to any way of and/or mechanisms to extending functionality by software or hardware to make information available or enable retrieval of information about internal variables, processes, states, etc. More particularly, in a preferred embodiment, by instrumenting a browser to set parameters in a state determiner, is referred to extending the browser to monitor or allow monitoring events, adding functionality to an event processor in the browser, or hooking up to events in the browser; and using this monitoring or functionality with relation to predefined events to set relevant parameters each time the predefined events occur.

Processing of a web page according to the method described herein refers to any processing from starting the retrieval of a main resource, over the synchronous processing including retrieving and processing sub resources, to managing and executing asynchronous tasks. The processing of the web page may also comprise handling of events and related script execution or retrieval and processing of sub resources initiated by interaction by a user or web robot with the web page, e.g. stemming from links, forms, user interface events like a keystroke, mouseover or mousedown, click, physically interacting with a display (e.g. providing capacitive and/or resistive feedback to a touch-sensitive display), providing audible stimuli (e.g. a voice command, tone), visual stimuli (e.g. displaying a gesture, pose, or symbol), etc., and thus not only when the loading of a new web page is involved.

The source code of the web page is according to the method any code in any form and language, e.g. languages or formats according to standards or references such as HTML, CSS, JavaScript, XML, etc., that may cause the creation of a time delayed queued processing task in the web page being processed. The source code may e.g. be the main resource or a script sub resource that contains code statements for creating a timer with a specific delay time and an associated script to be executed when the delay time has elapsed, or a style sheet sub resource causing the establishment of a transition with defined delay times. The source code of the web page is referred to herein as source for the desired or intended delay time for a certain task, and thus comprises any means for a web page designer, owner, author, coder, programmer, etc., to state an intended delay for a task. The disclosed method is advantageous because it allows for changing, particularly reducing, the desired or intended delay time, as represented by what is above referred to as the source code of the web page.

An advantageous embodiment is obtained when the reducing the time is performed by a delay converter DC in relation to the creation of the queued processing task QPT.

The delay converter may be implemented as part of a browser, a browser plugin or an external application. The delay converter should preferably be informed each time a queued processing task is created, at least if associated with a delay of any kind, and/or the delay convert should be in control of the creation of queued processing tasks and/or delays.

An advantageous embodiment is obtained when the method of reducing the processing time of a web page comprises a step of tracing predefined processing events that may cause creation of queued processing tasks QPT with associated delays, and invoking a delay converter DC to change the delays by one or more of absolute decrements, relative decrements and proportional decrements.

According to the described method the tracing of processing events refers to any way of monitoring or otherwise discovering that a predefined processing event fires or has fired. In a preferred embodiment, the browser is instrumented, e.g. as described above, to be able to trace all the processing events that may be relevant for a state determiner according to the method. Tracing the predefined processing events facilitates the setting of parameters in the state determiner accordingly, and thereby the determining of a web page processing state.

In accordance with the herein described method it is noted, that processing events related to queued processing tasks may comprise any event happening during processing of a web page, e.g. performing processing operations such as retrieving, parsing, executing, rendering, etc., as would be understood by one having ordinary skill in the art upon reading the present descriptions. The events listed in Table 1 illustrate several exemplary processing events that may be relevant to monitor and trace, for example because they may relate to queued processing tasks QPT1 . . . QPTn, e.g. by being indicative of, e.g., the creation, execution or removal of a queued processing task.

An advantageous embodiment is obtained when said queued processing tasks QPT comprise one or more tasks among the tasks of: timer tasks, scheduled redirection tasks, cascading style sheet transition tasks, queued script tasks, and deferred event tasks.

An advantageous embodiment is obtained when the method of reducing the processing time of a web page comprises a step of managing reduced delay times of two or more queued processing tasks so that they may be executed in the same order as defined by the source code of the web page.

According to the described method the queued tasks should preferably be executed in the order they were intended to. Whereas it is often safe to assume that the actual delays are not significant for the content of a web page, though probably for a human user's experience, it can sometimes not in the same way be assumed, that the order in which the tasks are executed, is insignificant. Therefore a preferred embodiment comprises managing of the tasks so that the delays are reduced in a way that makes the tasks be executed in the same order as intended, just a lot earlier than intended.

A further embodiment relates to a system comprising a task queue TQ configured to store during processing of a web page by means of a browser WB one or more queued processing tasks QPT, at least one of which associated with a time that the start of execution of the queued processing task QPT is set to be delayed by the source code of the web page; a delay converter DC configured to reduce said time that the start of execution of the queued processing task is set to be delayed.

A beneficial system to reduce some or all delays, e.g. timer values, scheduled redirect times, CSS transition intervals, etc. during processing of a web page is provided. For web robot browsing this is particularly relevant, as most relatively long delays used in web pages are employed to provide a certain experience or visual effects for the user—which is typically irrelevant for web robot users. The elements of the system and its advantages correspond to like features of the above-described method.

An advantageous embodiment is obtained when said browser WB comprises instrumentation for tracing predefined processing events related to said queued processing tasks QPT.

According to the disclosed system, the instrumentation for tracing may comprise any way of hooking into the processing events, e.g. the events disclosed in Table 1.

Instrumentation, as used herein, may refer to any way of and/or mechanisms to extending functionality by software or hardware to make information available or enable retrieval of information about internal variables, processes, states, etc. More particularly, in a preferred embodiment, by instrumenting a browser to trace processing events, is referred to extending the browser to monitor or allow monitoring events, adding functionality to an event processor in the browser, or hooking up to events in the browser; and using this monitoring or functionality with relation to predefined events to be enable or facilitate the delay converter in reducing delays of queued processing tasks.

An advantageous embodiment is obtained when said queued processing tasks QPT comprise one or more tasks among the tasks of: timer tasks, scheduled redirection tasks, cascading style sheet transition tasks, queued script tasks, and deferred event tasks.

Web Page Processing State

FIG. 1 illustrates an embodiment of the presently disclosed inventive concept(s). To process a web page, a main resource MR, typically an HTML-document, is fetched via a network N and processed by a web page processor WPP, constituting a part of a browser. Typically a number of further resources, sub resources SR1, SRn, e.g. style sheet documents, image files, script files, etc., are also fetched during the processing in the web page processor WPP in accordance with references in the main resource or other sub resources, or as a result of carrying out instructions in a script or other client side processed content. The processing of the web page typically leads to the rendering of a graphical representation GR of the web page. The graphical representation exists internally in memory used by the browser, but may of course also be presented to a user on a computer monitor or display. It is noted that a browser within the scope of the invention may be a typical web browser, possibly with suitable browser plugins, as found in computers or smartphones, or it may be a headless browser, i.e. a browser only performing internal processing of the web page and not presenting a graphical rendering of it to the user.

The browser further comprises a task queue TQ for storing queued processing tasks QPT1 . . . QPTn. These tasks are asynchronous tasks with respect to the processing of the main resource, and may for instance comprise timers, deferred scripts, style sheet animations, asynchronous XMLHttpRequests, etc. as would be understood by one having ordinary skill in the art upon reading the present descriptions.

In some approaches, when processing a web page, browsers may parse and execute instructions in the main resource MR synchronously, i.e. sequentially with each task waiting for the previous to complete, and if during the synchronous processing there is a reference to sub resources, the synchronous processing will follow the references and parse and execute sub resources within the sequence, then turn back to the main resource, and go on to the end is reached. Any instructions or references to tasks that should be carried out asynchronously to the main sequence, i.e. with the main sequence continuing without waiting for completion of the asynchronous task, are put into the task queue TQ, and executed when there is time, when they are ready for it, when a certain time has elapsed or a certain event has occurred, or any other asynchronous criteria recognised by the particular type of browser.

It is noted that, in various embodiments, the task queue TQ may be anything from a simple first-in-first-out buffer, over buffers divided into task types, priorities or other categories, to random access buffers. With respect to the presently disclosed inventive concept(s), a relevant property of the queued processing tasks is, that they are possibly not, even probably not, carried out before the synchronous processing of the main resource is completed, and it may not be possible to determine when, if ever, they will be carried out, or if their execution will lead to further queued tasks.

In the embodiment of the invention illustrated in FIG. 1 is further shown a state determiner SD according to the presently disclosed inventive concept(s), which may be implemented as a part of a browser e.g. natively or as a plugin, or it may be an external feature communicating with the browser which is processing the web page. The state determiner SD comprises logic, in the form of software instructions and/or hardware configurations, e.g. forming an algorithm, a set of rules or logical statements, etc., to determine a degree of completeness of the processing of the web page or whether or not the web page is sufficiently processed to comprise expected information or be ready for interaction. This information is output from the state determiner SD as a web page processing state WPPS.

In a preferred embodiment of the invention, the state determiner SD determines the web page processing state WPPS on the basis of parameters P1 . . . Pn set in the state determiner upon the occurrence of certain processing events, at least related to queued processing tasks. The parameters may e.g. be stored in a parameter register PR and may e.g. comprise information about the existence of queued processing tasks, what objects they are manipulating or interacting with, which event triggered the creation of the task, which tasks, if any, were created by events occurring during the task, etc. For example, for a queued task being a timer, the parameter may comprise one or more of the timer's ID, the script or instruction that will be executed upon timeout, the time or interval set for the timer, information about whether the timer is started, or whether it has timed out already, information about whether it is part of a chain of timers or other queued tasks, information about which task created the timer, information about which new, queued tasks are created by the script executed by the timer, etc. For example, for a queued task being an asynchronous XMLHttpRequest, the parameter may comprise one or more of an identification of the XMLHttpRequest, characteristics regarding the kind and content of the request, information about the server to which the request is made, information about whether or not a response has been received, information about the kind and content of a response, information about scripts executed in relation to the receipt of a response, information about whether it is part of a chain of XMLHttpRequests or other queued tasks, information about which task created the request, information about which new, queued tasks are created by the script handling the request, e.g. in reaction to a response, etc.

In a more detailed example of one embodiment of the presently disclosed inventive concepts, the processing in the browser of an event installing a timer may cause a parameter P1 to be set, for example by setting the parameter P1 in the state determiner SD. The parameters may, e.g. be stored in a class, a table, an array, or other suitable data construct, and the different information may in the data construct preferably be stored in variables or data formats reflecting their origin, e.g. storing a milliseconds timer interval in a variable or class property of an integer type, storing a function name in a string type property or a function pointer type property, etc. The setting of the parameters may preferably be performed by an event handler or event listener class or method in the browser, e.g. enabled by instrumentation as described above, upon detection of a relevant processing event, by invoking a relevant class or method in the state determiner. In an embodiment, the integration of browser and state determiner may be sufficiently strong to enable an event listener method or class of the state determiner to intercept the events by itself and invoke analysis and storing of information in parameters accordingly. The parameter P1 may e.g. comprise information about the existence of the timer, the timer id, the timer interval and/or remaining time, the function to be executed when the timer fires, etc. Another event occurring during processing of the web page may cause an asynchronous XMLHttpRequest to start, which for example may cause a parameter P2 to be set in the state determiner SD. The parameter P2 may e.g. comprise information about the existence of the XMLHttpRequest (XHR), a unique id, what kind of object it is retrieving, e.g. additional content for the web page, a script to be executed, etc. or a category of the purpose of the XHR, etc. With the parameters P1 and P2 in the current example being set to expose the existence of a pending timer and a nonfinished XHR, the logic of the state determiner may in a preferred embodiment determine the web page processing state to a value indicating that processing has actually not finished yet, even though the sequential processing of the main resource and any synchronous sub resources may be finished already and the emit load finished-event has already been fired by the browser.

To continue the above example, according to an embodiment of the invention, when an event occurs in the browser indicating that the XHR with a particular unique id has finished loading and has been executed together with any synchronous event handlers appearing therefrom, the parameter P2 in the state determiner SD is set to reflect that this XHR is finished. For example, in one embodiment, the parameter P2 may simply be deleted. Analogously, when an event indicates that the timer with a timer id matching parameter P1 was fired, the related function executed, and any synchronous events handled, the parameter P1 may be set to reflect its irrelevance e.g. by means of a setting a boolean type property with values representing pending or complete, or the like, or simply be removed. The logic of the state determiner may now determine that no queued tasks pending execution remains, and the web page processing state WPPS can therefore be set to indicate that processing is complete.

In a preferred embodiment of the invention, the logic of the state determiner may comprise a path for indicating a degree of completeness or readiness, and/or indicate that the required processing has been carried out, that only operational tasks remain, (e.g. as opposed to initializing tasks), etc. as would be understood by one having ordinary skill in the art upon reading the present descriptions. This possibility is particularly advantageous in embodiments where the web page code may be designed and/or employed to maintain for instance a number of non-finished, queued tasks as long as the web page is open in the browser. This is particularly true for so called one-page web applications that, e.g. controlled by timers, perform periodic and/or continuous content loading, e.g. applications that utilize periodic whole or partial reloads of content, e.g. social media updates continuously by means of e.g. XHR as long as the web page is open in the browser, or web pages with repeating timers, deferred tasks or style sheet animations, etc. as would be understood by one having ordinary skill in the art upon reading the present descriptions.

In preferred approaches, periodic and/or continuous content loading is designed to give the user a special experience when exploring the web page, but may be insignificant in relation to the actual loading and/or handling of the web page content that the user is looking for, in particular when the user is a web robot. For such web pages, the state determiner SD may comprise logic to set the web page processing state WPPS to indicate that information is probably ready, or that all loading is finished, etc., as would be understood by one having ordinary skill in the art upon reading the present descriptions.

For example, in one approach the web page processing state WPPS may indicate that information is "probably ready" when only a certain type of queued processing tasks remains, or the remaining tasks are all repetitions of tasks that have already been executed, tasks which will repeatedly create, invoke, call, etc. themselves when executed, and/or when a certain number of new, (e.g. chained) tasks have been executed. In various approaches, the aforementioned state determiner logic may include fuzzy logic.

In order to be able to know about existing, non-processed queued processing tasks before the synchronous processing of the main resource is complete, the web page processor WPP should preferably be configured to set a parameter (e.g. to set a parameter P1 . . . Pn in the state determiner SD) each time an instruction or event in the synchronous processing causes the establishment of a relevant kind of queued processing task. In other words, if not already present, the browser is in an embodiment of the presently disclosed inventive concept(s) preferably instrumented with additional handlers to be able to observe and set state determiner parameters for all relevant queuing of tasks, and execution or removal of queued tasks. In other words, an embodiment of the presently disclosed inventive concept(s) establishes a kind of watchpoint within the synchronous execution environment to detect all creation of asynchronous processing tasks. Contrary to conventional browser processing where it may be impossible to tell if an idle state means that processing is over or that it is just waiting for an asynchronous task to return, the presently disclosed inventive concept(s) allows for linking together all processing in the browser for a certain web page, including processing that takes place after the first synchronous processing completes. This is, according to one embodiment of the inventive concepts presently disclosed, achieved by parameters in the state determiner, which is thus at any time able to determine whether processing has finished, or to what degree it has probably completed initializing the web page.

Figure 2:
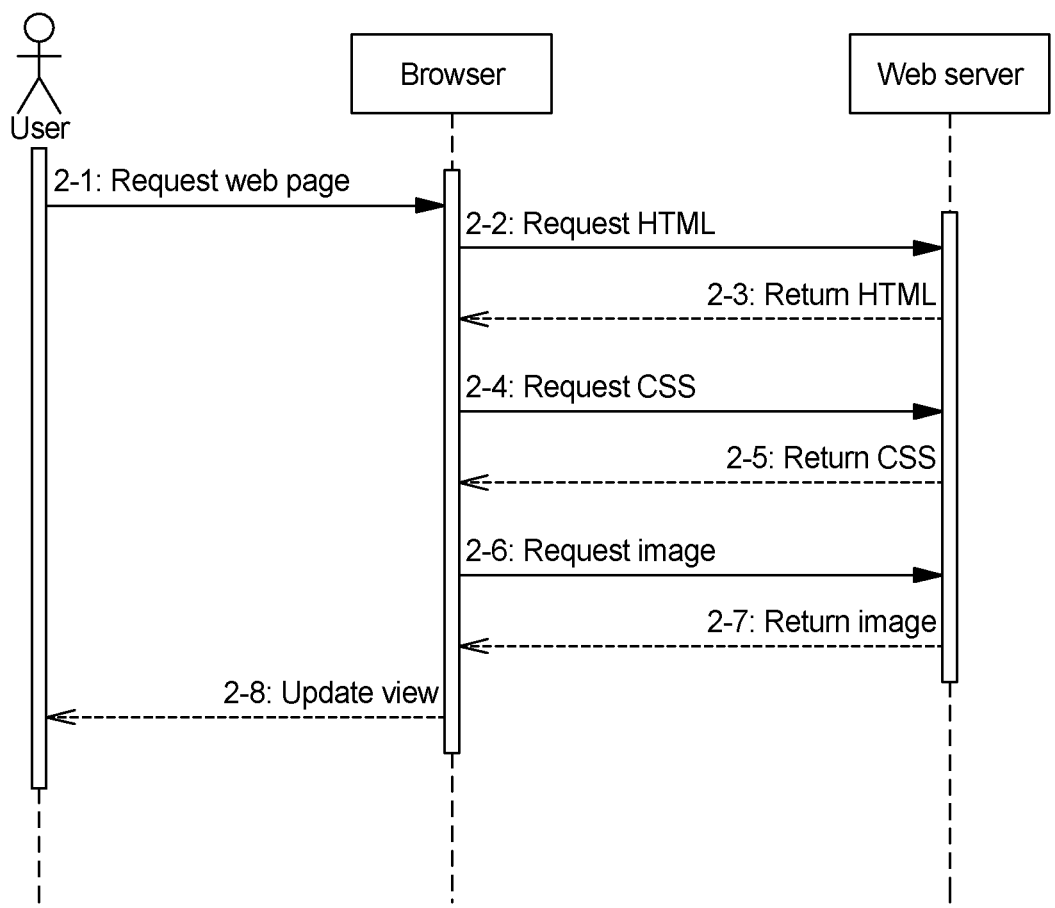
FIG. 2 is a simplified sequence diagram illustrating prior art web page processing for simple web pages.
Figure 3:
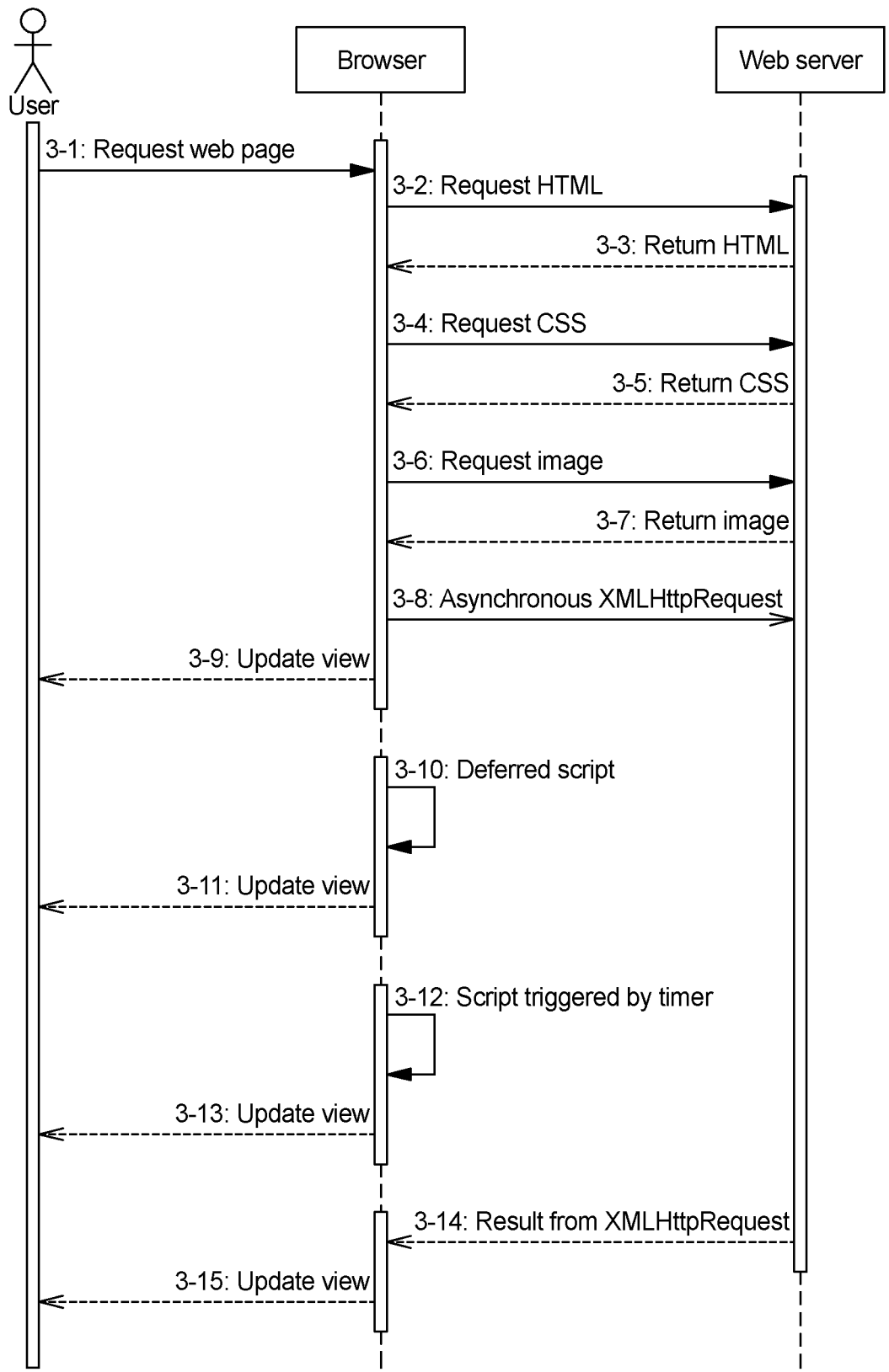
FIG. 3 is a simplified sequence diagram illustrating a problem related to prior art web page processing of web pages using queued tasks.

FIGS. 2 and 3 are provided as simplified sequence diagrams to illustrate further aspects of the problem. The sequence diagrams are simplified by only illustrating principles in the message flow. In reality, as will be known by a person skilled in the art, further messages and processes may exist to accomplish the principles illustrated. FIG. 2 is a simplified sequence diagram illustrating an example of prior art web page processing for a typical, simple web page. By message 2-1 a user requests a web page from a browser, e.g. by entering an internet address, an URL, and the browser, after having resolved the address, etc., requests by message 2-2 an HTML-document, i.e. the main resource of the web page, from the relevant web server. The web server sends response 2-3 with the HTML-document to the browser, which starts processing it. At some point, the browser realizes that the main resource refers to a sub resource, a CSS document, and the browser requests the CSS by message 2-4 synchronously, i.e. by waiting for the CSS. The web server responds 2-5 with the style sheet, and the browser continues its synchronous processing. After having also requested 2-6 another sub resource, an image, and received it 2-7, the browser finishes its processing of the main resource. As all processing and events have been synchronous in this example, the end of processing the main resource also means that the browser has finished loading and processing the web page, and it displays the web page to the user by updating the user's view 2-8.

FIG. 3 is a simplified sequence diagram illustrating an example of prior art web page processing for a complex web page making use of asynchronous tasks. The initial requesting a web page and loading and processing of the main resource, and synchronous loading of sub resources, is carried out by messages 3-1 to 3-7 similarly to the description of FIG. 2 above. However in this example, additionally to what was illustrated in FIG. 2, the processing of the main resource also causes an asynchronous XMLHttpRequest to be sent to the web server by 3-8, and as will be discovered below, it also causes creation of a deferred script and a timer, which are however not processed synchronously within the main resource life line. Hence, when the main resource has finished loading together with all synchronously handled sub resources, the browser is (apparently) finished, and updates the user's view by 3-9.

However, at some time the browser's processor lives up again to execute by 3-10 the deferred script that was created, but not executed, by the synchronous processing earlier. When the script comes to an end, the processor is (apparently) finished, and updates the user's view by 3-11.

Likewise, at some time, the browser's processor is waken up once again to execute by 3-12 a script triggered by the timer that was installer, but not fired, by the synchronous processing earlier. And again, when the timer script finishes, the browser is finished and updates the user's view by 3-13.

Also asynchronously the web server at some time responds by 3-14 with the result of the XMLHttpRequest that was also transmitted earlier. The browser processes the result, updates the user's view in 3-15, and again finds itself probably finished processing the web page.

In the example illustrated in FIG. 3 no further asynchronous events occurs, but in different examples several other tasks could have been setup, or, which is also typical, the asynchronous tasks could cause the establishment of further asynchronous tasks, or timers could be interval timers executing their script asynchronously, over and over again. As mentioned above, these circumstances add to the uncertainty in prior art of when, if ever, the web page is in fact finished loading and processing.

Figure 4:
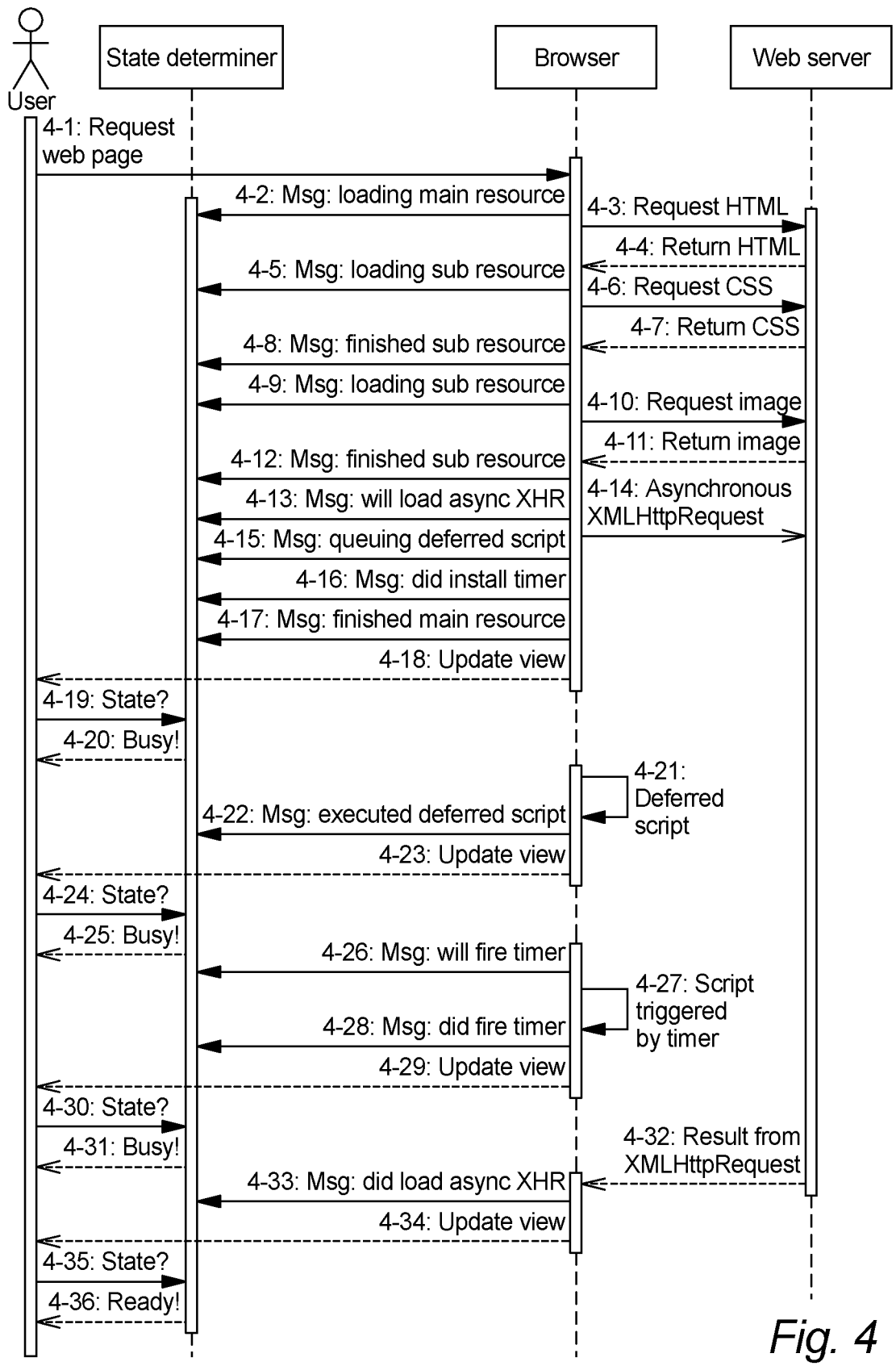
FIG. 4 is a simplified sequence diagram illustrating one embodiment of web page processing according to the presently disclosed inventive concepts.

FIG. 4 illustrates an embodiment of the invention by a simplified sequence diagram where a simplified message flow conceptualizes how the loading of a complex web page e.g. as the one discussed above with reference to FIG. 3, could turn out in an embodiment of the presently disclosed inventive concept(s) employing a state determiner SD. The sequence diagram is simplified by only illustrating principles in the message flow. In reality, as will be known by a person skilled in the art, further messages and processes may exist to accomplish the principles illustrated.

By message 4-1 a user requests a web page from a browser, which by message 4-2 informs the state determiner SD that it starts loading the main resource. This event may be stored in a parameter, e.g. P1, in the state determiner, for example together with information about which web page and what documents constitutes the main resource, etc. The browser also by 4-3 requests the HTML document from a web server, which sends response 4-4 with the HTML-document to the browser.

During processing, the browser realizes that the main resource refers to a sub resource, a CSS document, and the browser informs the state determiner SD by message 4-5 that it is loading a sub resource. The state determiner may e.g. store this information in a parameter, e.g. P2, together with information about the kind of sub resource, etc. Then the browser requests the CSS document by message 4-6 synchronously, i.e. by waiting for the CSS. Upon receipt 4-7 of the style sheet document, the browser informs the state determiner SD by 4-8 that it finished loading this particular sub resource. The state determiner may in an embodiment clear parameter P2 as it is no longer relevant for determining what the browser is busy with. In an alternative embodiment of the invention, the state determiner may keep parameter P2 in the parameter register, but mark it as completed.

The events 4-9 to 4-12 in FIG. 4 illustrates the loading of another sub resource with messages and track keeping by the state determiner, e.g. by a third parameter P3, similar to the description above regarding events 4-5 to 4-8.

After concluding the synchronous processing of the image sub resource, the browser in the example of FIG. 4 gets to a point in the main resource where an asynchronous XMLHttpRequest is going to be made. A message 4-13 reflecting this event is sent to the state determiner SD which stores this information, e.g. in a parameter P4, and the browser sends the asynchronous XMLHttpRequest to the web server by 4-14. Because this is an asynchronous task, the browser processor does not pause to await a response from the web server, but immediately proceeds with the main resource processing. This involves in the current example, the queuing of a script with executed deferred to later, and the installation of a timer to fire after a specified amount of time, i.e. both asynchronous tasks that does not pause the browser processing. At the queuing of the deferred script, the browser informs the state determiner SD by message 4-15, and the state determiner may track this event by storing information about the deferred script in its parameter register, in this example e.g. as parameter P5. Likewise, at the installation of the timer, the browser informs the state determiner SD by message 4-16, and this is tracked e.g. by a parameter P6, for example storing the ID of the timer, the time for firing the timer, and possibly information about the instruction or script to execute when the timer fires.

When the browser, still in the example of FIG. 4, completes the synchronous processing related to the main resource, it informs the state determiner so by message 4-17. The state determiner recognizes this as associated with the parameter P1 created earlier when the loading of the main resource started, and may in an embodiment clear parameter P1 to indicate that it no longer influences the determining of a browser readiness state, or in an alternative embodiment, simply mark P1 as completed, but keep the information. Finally, the browser updates the user's view by 4-18 on the basis of the processing carried out until that point.

The browser is after the response 4-18 to the user apparently no longer processing the web page, but because the state determiner SD has been keeping track, according to the invention, of the asynchronous tasks, an inquiry 4-19 to the state determiner may in this example, cause the state determiner to consider the parameters P1-P6, and evaluate the browser to be in fact still processing as indicated by the busy!message 4-20, as only tasks related to parameters P1-P3 are marked as completed, whereas parameters P4-P6 represent a pending XMLHttpRequest, a deferred script still not executed, and a timer not yet fired.

At some point the browser processer in FIG. 4 executes by 4-21 the deferred script, and sends a message 4-22 to the state determiner about this when all related, synchronous processing has been carried out. The state determiner clears parameter P5 or marks it as completed. The browser updates the user's view by 4-23 to reflect any changes made by executing the deferred script. Again the browser processor is apparently finished processing the web page, but as described above, an inquiry 4-24 to the state determiner will again reveal by response 4-25 that the processing is not finished, as still parameters P3 regarding the XMLHttpRequest and P5 regarding the timer reflect pending, asynchronous tasks.

Likewise, when the time comes for the timer to fire, the state determiner is in this example informed by 4-26 before the execution of the timer's script starts, and as above, by 4-28, when all synchronous processing triggered by the timer 4-27, has completed. The state determiner updates parameter P6 each time new information about the timer with this particular ID is received, and by receipt of message 4-28 either clears P6 or marks it as completed. As above, when the view is updated by 429 and all processing may seem to have completed, an inquiry 4-30 to the state determiner gets a busy!-response 4-31 because it is still tracking a pending, asynchronous XMLHttpRequest by parameter P3.

When the result 4-32 from the web browser in response to the asynchronous XMLHttpRequest is finally received and all tasks related to the synchronous processing of the response has been carried out, the state determiner is informed accordingly by 4-33, and may clear or mark as complete the information in parameter P3 regarding the XMLHttpRequest. Another inquiry 4-35 to the state determiner for the web page processing state WPPS may now result in a ready !response 4-36, as all tasks are cleared or completed, and the parameter register contains no more pending, scheduled, deferred, timed, queued, etc., or other asynchronous tasks.

In the above-described example, the state determiner keeps track of all the events that it is informed about, both synchronous and asynchronous events. In a different embodiment, only asynchronous events are kept in the parameter register, possibly together with key synchronous events, e.g. the starting and finishing of processing a main resource.

As can be seen from comparing FIG. 3 and FIG. 4, it is mainly the tracking of asynchronous events that facilitates the state determiner to determine a web page processing state reflecting the degree of readiness or completeness after the browser has finished processing the main resource and related, synchronous tasks. In other words, the state determiner during synchronous processing hooks up to all asynchronous tasks that are being created, so that it can use the fact that they exist and track when they are executed, but also in different embodiments of the invention, e.g. use information about the pending tasks to determine their relevance or priority for establishing a more informed web page processing state WPPS, as described below. In embodiments of the presently disclosed inventive concept(s), by being able to register asynchronous tasks when they are created during a synchronous processing, the state determiner is able to track chaining of asynchronous tasks, i.e. when the execution of a task that was created asynchronously causes creation of a new asynchronous task, for example a timer starting itself over each time it is executed, for example to drive banner or image rotators or to perform automatic news updates each 30 seconds.

According to one embodiment of the presently disclosed inventive concepts, any creation of a task to be queued for execution asynchronously may be relevant to monitor and use for creation or update of parameters in the state determiner, and is considered within the scope of the invention. However, to provide some practical examples, preferred embodiments working with contemporary browsers and web pages may be instrumented with for example the trace events related to the situations listed in Table 1 below. It should be noted, that several of the events mentioned are not automatically fired by a standard browser, but the browser may be instrumented to that purpose in embodiments of the presently disclosed inventive concept(s). It is also noted, that some of the events identified may not necessarily relate to asynchronous task execution, but may be included in preferred embodiments of the invention to facilitate the state determiner's evaluation and monitoring of the web page processing state. As mentioned above, a trace event is typically followed by information identifying the specific object being initiated or changed and other relevant information facilitating the state determiner to determine changes in the overall web page processing state on the basis of the parameters created and updated in reaction to trace events. It is noted that Table 1 is not exhaustive, nor is it mandatory. Fewer, more and/or other events may be relevant to use in certain embodiments of the presently disclosed inventive concept(s), for example for different implementations of web page processors WPP, for different browser add-ons extending the range of possible tasks, and of course for future kinds of asynchronous tasks.

TABLE 1

Examples of trace events

| Trace event name | Description |
|---|---|
| Did Install Timer | Timer has been installed. |
| Will Fire Timer | Timer is about to fire, and its related JavaScript function has not yet been executed. |
| Did Fire Timer | Timer was fired, and the related JavaScript function, including any synchronous actions, has been run. |
| Did Remove Timer | Timer was removed. |
| Will Load Asynchronous XHR | Is about to start an asynchronous XMLHttpRequest. This signal is synchronous with the JavaScript setting it up. |
| Will Change XHR Ready State | |
| Did Change XHR Ready State | |
| Will Load XHR | Is starting an XMLHttpRequest. |
| Did Load XHR | Finished loading XMLHttpRequest, and finished executing any synchronous event handlers stemming from this event. |
| Did Fail XHR | Failed loading XMLHttpRequest, and finished executing any synchronous event handlers stemming from this event. |
| Did Schedule Redirect | A redirect has been scheduled, the browser is about to redirect to a different URL. |
| Will Fire Scheduled Redirect | The redirect process has begun. |
| Did Fire Scheduled Redirect | The redirect process has completed; at this point the new main resource load has started. |
| Provisional Load Started | A new main resource is about to be loaded; at this point no events have been fired, and the loading of the resource has not been initiated. |
| Will Perform Client Redirect | A client redirect had been initiated, cancels all previous client redirects. |
| Did Cancel Client Redirect | The client redirect was canceled. |
| Loading Main Resource | Loading of the main resource has begun. |
| Finished Loading Main Resource | Loading of the main resource has finished, and any event handlers synchronous to this event have been run. Any sub resource loads are also initiated at this point. |
| Loading Sub Resource | The loading of a sub resource (a script, a CSS or in some cases an image) has been initiated. |
| Finished Loading Sub Resource | The loading of a sub resource has finished, events are fired and handled. |
| Queuing Script | A deferred script execution has been queued. |
| Executed Queued Script | A deferred script was executed. |
| Executing Script | |
| Executed Script | |
| Loading Start | |
| Loading Interactive | |
| Loading Completed | |
| Transition Started | A CSS transition (CSS animation) has started. |
| Transition Ended | A CSS transition (CSS animation) has ended, all related events fired and handled. |
| Schedule Style Recalculation Start | Recent change in browser's internal state has forced a recalculation of the computed styles. |
| Schedule Style Recalculation End | The scheduled style recalculation has finished, any events or derived transitions have been initiated. |
| Added Deferred Event | An event is about to be added to a queue of deferred events, and awaits dispatching. |

TABLE 1-continued

Examples of trace events

| Trace event name | Description |
| --- | --- |
| Removed Deferred Event | An event was removed from the queue of deferred events. |
| Dispatched Deferred Event | An event was popped from the queue of deferred events and was fired and handled. |
| Queued Post Attach Callback | |
| Dispatched Post Attach Callback | |

As mentioned above, one possible criterion to use in an embodiment of the invention for setting the web page processing state WPPS to "finished processing" or the like is simply to wait for all asynchronous tasks to be executed. This can in an embodiment of the invention be achieved by monitoring the parameters of the state determiner, e.g. as described above with relation to FIG. 4. However, as also mentioned above, some web pages repeatedly create asynchronous tasks, e.g. for loading updates or providing an enhanced user experience. For such web pages the simple criterion to wait for all asynchronous tasks to disappear may typically mean that the state determiner can never change the web page processing state WPPS to indicate that processing is complete.

In preferred embodiments of the invention, the state determiner may therefore be set up to use a different criterion, or e.g. have a set of criteria to choose from according to the specific circumstances. In preferred embodiments the criteria are based on monitoring the parameters of the state determiner and/or performing analysis of the web page as described in more detail farther below, but combination with time criteria may also be implemented in embodiments of the presently disclosed inventive concept(s).

In the below Table 2 are described examples of alternative criteria for setting a web page processing state WPPS to e.g. complete, a degree of completeness or readiness, or ready for interaction, even when there are still activity going on. The list of criteria is neither exhaustive nor mandatory, and fewer, more and/or other criteria may be relevant and employed in different embodiments of the invention. The different criteria may in different embodiments be prioritized differently, e.g. by weighing differently in an accumulation, and/or some criteria may be required to be fulfilled before others are considered.

TABLE 2

Examples of criteria used by the state determiner

| Criterion | Comments |
| --- | --- |
| Pending tasks exists (boolean) | A simple criteria, e.g. as described in relation to FIG. 4 above. When this resolves to false, the web page has completely finished processing. As mentioned, this criterion may be less usable, in particular for web pages with repeating tasks, thereby maintaining this criterion in a true state. |
| Number of pending tasks (integer) | Enhanced version of the above criterion. If zero, this equals the above criterion being false, and the web page processing state is clear. If non-zero, a threshold or weighing of the value may be used to indicate a degree of completion or possibility of important processing being completed. However, this criterion is strictly quantitative, and does not consider the quality of any remaining, pending tasks. Moreover, it will in most embodiments be useless for web pages having e.g. a single or few, but ever repeating, asynchronous tasks. |
| Length of chain of timer events and/or XMLHttpRequests and/or other asynchronous tasks (integer) | A criterion employed to catch ever-repeating tasks to be able to consider such tasks not a part of the actual loading of the web page but rather a part of the experience of using the web page. It allows for setting a web page processing state to complete or ready even though e.g. activity for news updates or entertainment is still going on. A specific example of a threshold that may be relevant for this criterion may e.g. be a length of 100 chained tasks. This criterion may also be used with weighing of the value together with other criteria, or e.g. together with an overall time duration of processing for the web page. |
| Duration since dispatch of an XMLHttpRequest (time, e.g. integer milliseconds) | A time-out kind of criterion to allow considering the processing complete even though a pending XMLHttpRequest has still not been responded to. Similar criteria may be employed for other tasks that also depend on asynchronous responses to be received. |
| Time scheduled for a redirect or refresh (time, e.g. integer milliseconds) | A criterion that may preferably be considered by a fixed threshold to discard, for example, all redirects and refreshes of the web page that are scheduled for more than, e.g., 1 second in the future. By considering only redirects or refreshes that are set to happen more or less immediately, e.g. in less than 1 second, it is possible to disregard redirects or refreshes designed e.g. as simple ways to force updating the web page at regular intervals. |
| Number of repetitions of an interval timer (integer) | A criterion to allow a repeating timer to execute its script a certain number of times, e.g. 100 times, and then disregard its existence for further determining of the processing state. |
| Time set for a timer event (time, e.g. integer milliseconds) | A criterion that may preferably be considered by a fixed threshold to discard, for example, a timer event that is set to fire in more than a certain time duration in the future. This allows for only taking into |

TABLE 2-continued

Examples of criteria used by the state determiner

| Criterion | Comments |
|---|---|
| | account timers with relatively short timeouts, as they are probably more likely to influence on the web page content that is considered part of the loading of the web page, than timers that only fires after a relative long period. |

As described, with criteria like the examples above, the state determiner is facilitated to set a web page processing state WPPS to e.g. complete or ready even though activity like endless update repetitions, image rotations, stock tickers, etc., is still happening and being processed by the browser. Also, the state determiner is able to set the web page processing state WPPS to complete or ready as soon as this can be determined, instead simply waiting a long, fixed amount of time to allow the processing to complete.

Also, by means of using qualitative criteria as described above or similar, instead of a simple overall duration criterion, it is ensured that for a certain web page the web page processing state WPPS changes at the same stage in the processing each time the web page is processed, regardless of minor differences from time to time in for example the time the loading of resources, the processing takes, etc., takes, and whether or not e.g. different responses to XMLHttpRequest arrives in different order, etc. This is particularly relevant for automated browsing by web robots, as they may not be able to analyse or use a web page that potentially changes behaviour each time it is visited because a fixed timeout makes the robot proceed at different stages in the processing. Some of the criteria used by the state determiner may have many possible values, and may, as described for some of the above, therefore by evaluated by comparing with a threshold, mapping different weights to different ranges in the value space, etc.

The state determiner may consider the different criteria and end up with one out of only a few, e.g. two, possibly web page processing states WPPS, e.g. "busy" or "ready", or "busy", "ready" or "complete", or the like. In one alternative embodiment, the web page processing state may be determined to a probability or degree of readiness or completeness, e.g. by considering the criteria values by weighing instead of thresholds. In an embodiment, the web robot or other user is allowed to set the thresholds, weights or even add or disregard criteria in the state determiner. In an embodiment, the web page processing state WPPS is provided by the state determiner together with reasons or comments to the state, e.g. that the processing is deemed complete even though a repeating timer is still active, but it has exceeded 100 repetitions.

In an embodiment, the analysis of parameters set in the state determiner may be combined with analysis of the rendered web page. For some web pages an overwhelming amount of asynchronous tasks or a high degree of repetition and chaining of tasks may make it difficult for the state determiner to rely solely on the trace events to determine an appropriate processing state or a relevant time to signal that the web page is ready for interaction or use of its content. For some web pages the relevant object for interaction or content for use may be loaded and ready a significant amount of time before the web page completes loading of images, advertisement banners, execution of scripts for statistics or targeting, etc. In both of these circumstances, it may be advantageous to combine the trace event approach with a geographic analysis of the web page as rendered by the browser, i.e. the graphical representation GR in the browser's memory, and/or with a semantic analysis of the browser's Document Object Model (DOM) tree, i.e. a formal representation of the web page in the browser's memory.

An example of the use of geographic analysis of the graphical representation of a web page may e.g. be a situation where login is required to get to the relevant content at a web site, and where the login form is known to be located at an otherwise irrelevant front page and include text boxes for user name and password and a login button. The analysis may involve examining, by means of image analysis techniques e.g. as available in the prior art, possibly combined with a degree of text recognition, in the upper right corner of the graphical representation of the front page for the appearance of a login form of the described nature. When it appears, the state determiner may set the web page processing state WPPS to a state like "ready to continue", or the like; or it may use the information from the graphical analysis with information based on the parameters set in relation to trace events, to determine the right time to signal readiness.

The use of analysis of the graphical representation of a web page in an embodiment of the presently disclosed inventive concept(s) is mostly advantageous for browsing of web pages where a user has beforehand defined what to look for, and what it should look like, for example where a user sets up a web robot for frequently looking up data from the same web page automatically. This embodiment of the presently disclosed inventive concept(s) may, however, also be beneficial to decrease the waiting time for users with e.g. visual impairment or otherwise not being able to or wanting to monitor their screen constantly.

The above example for the use of geographic analysis of the graphical representation of a web page may also apply to an embodiment of the invention having the event monitoring supplemented by analysis of the DOM-tree, mutatis mutandis. For example, the state determiner may monitor the DOM-tree to immediately know when HTML-tags for a form with two text boxes and a login button appears, together with a relevant login landing page URL. The analysis may or may not include also waiting for relevant form validation scripts to be loaded, etc. When it appears, the state determiner may set the web page processing state WPPS to a state like "ready to continue", or the like; or it may use the information from the DOM-tree analysis with information based on the parameters set in relation to trace events, to determine the right time to signal readiness.

Like mentioned above in relation to the graphical analysis, also the supplementing DOM-tree analysis may be particularly useful when repeatedly loading a known web page, e.g. by means of a web robot, where it may be may feasible to have a user define beforehand what to look for in the DOM-tree analysis in for a particular web page. Embodiments of the presently disclosed inventive concept(s) comprising DOM-tree analysis may also be used to improve browsing for disabled users.

Figure 5:
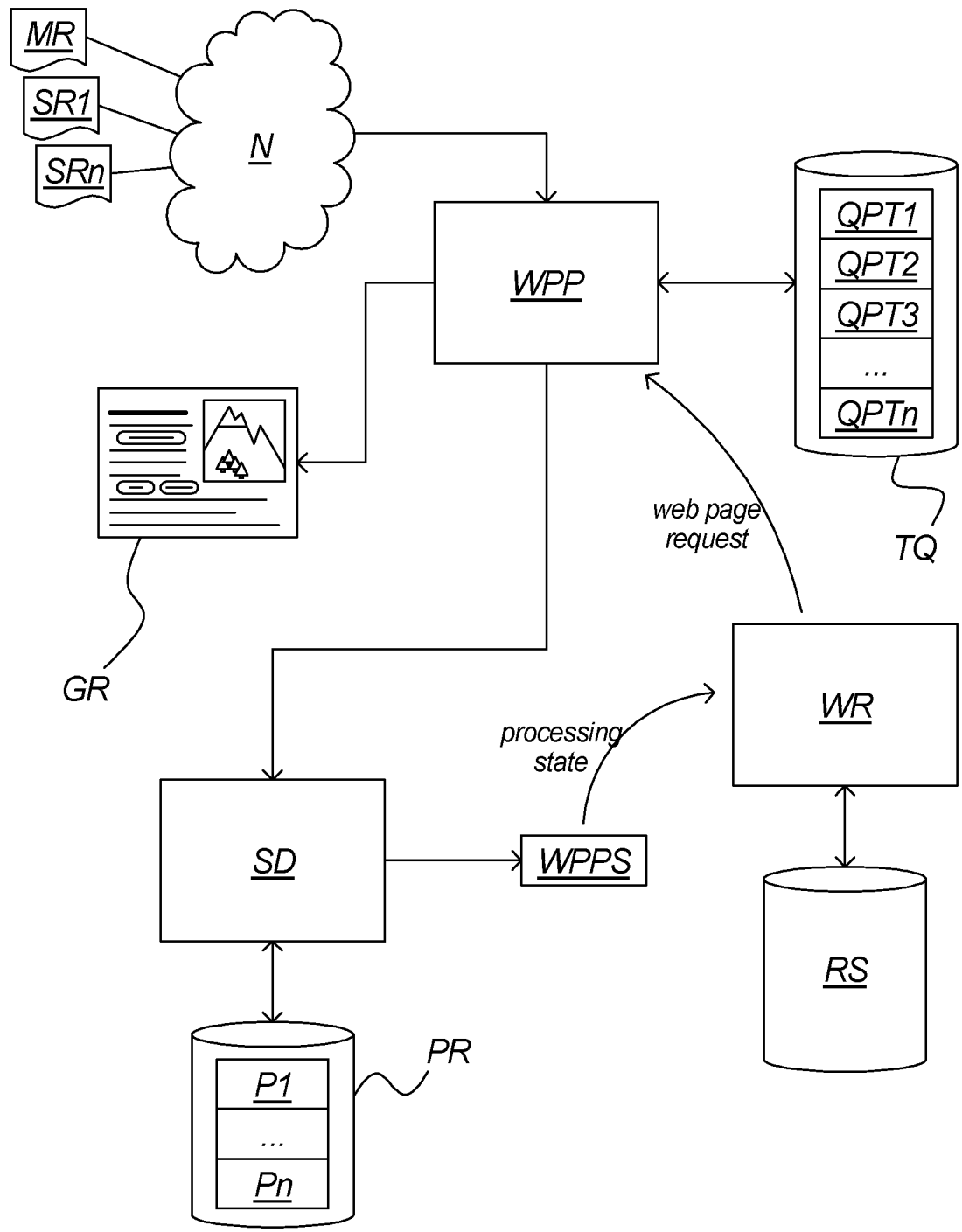
FIG. 5 illustrates one embodiment of interaction between a browser and a web robot according to the presently disclosed inventive concepts.

The presently disclosed inventive concept(s) is particularly useful when having a web robot WR browsing the web page, as illustrated in FIG. 5. The web robot WR comprises a robot storage RS, i.e. for storing content and other information retrieved from web pages, be it temporarily for example in RAM or the like, and/or more permanently on a hard drive or flash drive.

In FIG. 5 is illustrated that the web robot WR requests a particular web page to be loaded and processed by the web page processor WPP. The state determiner SD at certain intervals determines and sets the web page processor WPPS according to the current parameters reflecting pending queued tasks, etc., and makes this information available to the web robot WR, either by actively pushing it, or by responding to an inquiry from the web robot. When the web page processor WPP achieves an acceptable state WPPS, e.g. indicating a state of completed processing, a state of ready for interaction, a state of content loaded, etc., the web robot WR preferably stores any relevant content for storage in the web robot storage, e.g. content it was meant to collect, and/or it interacts with the loaded web page in the form that it is meant to interact with, e.g. by requesting a new web page or filling out and posting a form at the web page, e.g. for login or lookup.

Figure 11:
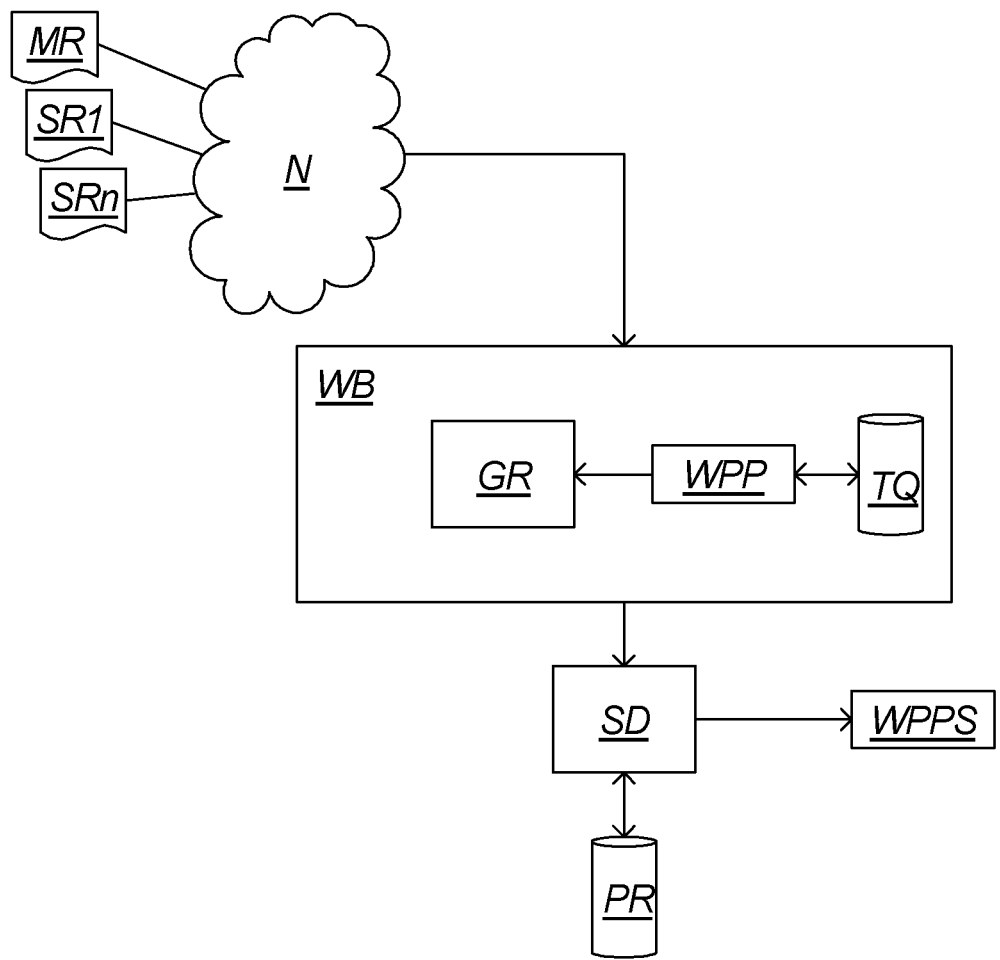
FIG. 11 illustrates one embodiment of the presently disclosed inventive concepts.

FIG. 11 illustrates an embodiment of the invention, where a browser WB comprises a web page processor WPP, memory for holding a graphical representation GR and a task queue. In correspondence with the browser WB is a state determiner SD arranged to store and retrieve parameters from a parameter register PR and output a web page processing state WPPS. The browser WB is preferably connected to a network N, e.g. the Internet, in order to be able to retrieve main resources MR and sub resources SR1, SRn, together forming a web page, from web servers or other network enabled devices. The different blocks, notably the state determiner and the way the state determiner and the browser may be arranged to support each other, may be embodied according to any of the embodiments described herein, e.g. above with reference any of FIG. 1-5. It is also noted, as described above, that alternative embodiments within the scope of the invention may have the browser WB comprise the state determiner SD, with or without the parameter register PR, as a native part or as a plugin, instead of the state determiner being an external component.

Delay Conversion

A different aspect which makes some web pages less accessible or ineffective to browse, in particular by web robots, but often also for human users, is use of timers, deferred scripts, delayed redirects, and all other web page processing tasks that are scheduled for an absolute or relative time ahead. When the user or robot is only interested in specific content or waiting for specific links or forms to appear to proceed to another web page or otherwise interact, they are typically not interested in waiting for fancy CSS transitions making content fly in from the side of the screen, script causing a form slowly appearing, a timer forcing viewing of an advertisement for 10 seconds before allowing proceeding, a message that a redirect will occur in 5 seconds, etc. The challenges experienced by a robot browsing a web page making use of deliberate delays may e.g. be even worse, if the robot is provided with a predetermined waiting time after requesting a web page to load, before assuming that the web page is loaded and ready for interaction. As deliberate waiting times in web pages are often significant, in the amount of seconds, as they are typically meant to give the user a recognizable experience, the accumulated waiting times may often or at least by a decent risk exceed the assumed safe waiting time set in the robot, unless the robot is set with an extremely long waiting time to be even safer, yet also much slower.

Figure 6:
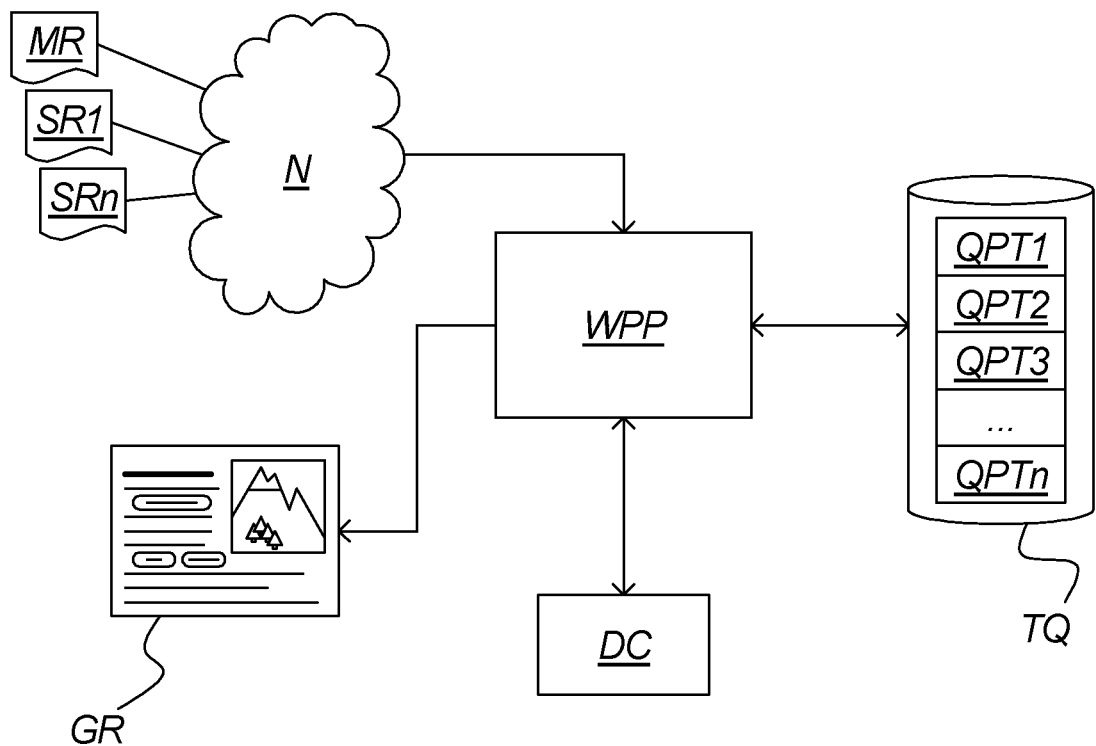
FIGS. 6 and 7 illustrate embodiments of the presently disclosed inventive concepts with a delay converter.

In a preferred embodiment of the presently disclosed inventive concept(s) illustrated in FIG. 6, a delay converter DC is provided to improve the browsing of web pages comprising timers and other delays, and is particularly useful in situations where some or all deliberate web page processing delays are considered unnecessary or irrelevant.

FIG. 6, like FIG. 1, illustrates a main resource MR, typically an HTML-document, which is fetched via a network N and processed by a web page processor WPP, constituting a part of a browser. Typically a number of further resources, sub resources SR1, SRn, e.g. style sheet documents, image files, script files, etc., are also fetched during the processing in the web page processor WPP in accordance with references in the main resource or other sub resources, or as a result of carrying out instructions in a script or other client side processed content. The processing of the web page typically leads to the rendering of a graphical representation GR of the web page. The graphical representation exists internally in memory used by the browser, but may of course also be presented to a user on a computer monitor or display. It is noted that a browser within the scope of the invention may be a typical web browser, possibly with suitable browser plugins, as found in computers or smartphones, or it may be a headless browser, i.e. a browser only performing internal processing of the web page and not presenting a graphical rendering of it to the user.

The browser further comprises a task queue TQ for storing queued processing tasks QPT1 QPTn. These tasks are asynchronous tasks with respect to the processing of the main resource, and may for instance comprise timers, deferred scripts, style sheet animations, asynchronous XMLHttpRequests, etc. Some of the queued processing tasks will be created with an associated timing information, e.g. a time to elapse before the task is executed, and interval to elapse between executions of repeated tasks, an absolute time for the, possibly earliest, acceptable time for a task to execute, etc. When processing a web page, browsers will basically parse and execute instructions in the main resource MR synchronously, i.e. sequentially with each task waiting for the previous to complete, and if during the synchronous processing there is a reference to sub resources, the synchronous processing will follow the references and parse and execute sub resources within the sequence, then turn back to the main resource, and go on to the end is reached. Any instructions or references to tasks that should be carried out asynchronously to the main sequence, i.e. with the main sequence continuing without waiting for completion of the asynchronous task, are put into the task queue TQ, and executed when there is time, or in accordance with their timing information as mentioned above. Also the tasks being processed synchronously may have related timing information that may cause the synchronous processing to be delayed or wait for a certain time or until a certain time.

The delay converter DC is arranged in connection with the web page processor WPP in such a way that the delay converter is able to control some or all of the abovementioned timing information. This may in a preferred embodiment of the invention be achieved by instrumenting the browser to let the delay converter DC know each time a queued processing task QPT with an associated timing information is created. In an embodiment this may be achieved by tracing some or all of the events listed in Table 1 above. Alternative embodiments of the invention may be implemented such that all queued tasks or at least some or all timed tasks are created via the delay converter DC, or by arranging the delay converter DC to monitor the task queue TQ to determine when timed tasks are created or exist.

In any of the above-mentioned embodiments, the delay converter is arranged to decrease or limit the amount of time to elapse before the timed tasks, i.e. queued processing tasks with associated timing information, are executed. This may e.g. be achieved by having the delay converter DC changing all timing values by absolute, relative or proportional decrements to new values that will cause the timed tasks to execute earlier and/or faster. In an embodiment the delay converter may e.g. set all delays, timer values, waiting times, etc., to the smallest possible or reasonable value for the particular browser, e.g. 1 ms, regardless of the actual values provided by the web page statements. This will make the delays, etc., practically insignificant and make the processing appear instantaneous, at least when disregarding possible bottlenecks in the retrieval of resources. In an alternative, preferred embodiment, the delay converter DC may e.g. set some or all timing values to a certain proportion of the original values, e.g. $\frac{1}{1000}$. This will practically reduce all waiting to one thousandth of the waiting intended by the web page designer. The mentioned embodiments may in an embodiment of the invention be combined such that certain delays are reset to the smallest possible value, making them appear instantaneous, whereas other delays are instead shortened proportionally, making them appear with delay, but faster than intended.

Figure 7:
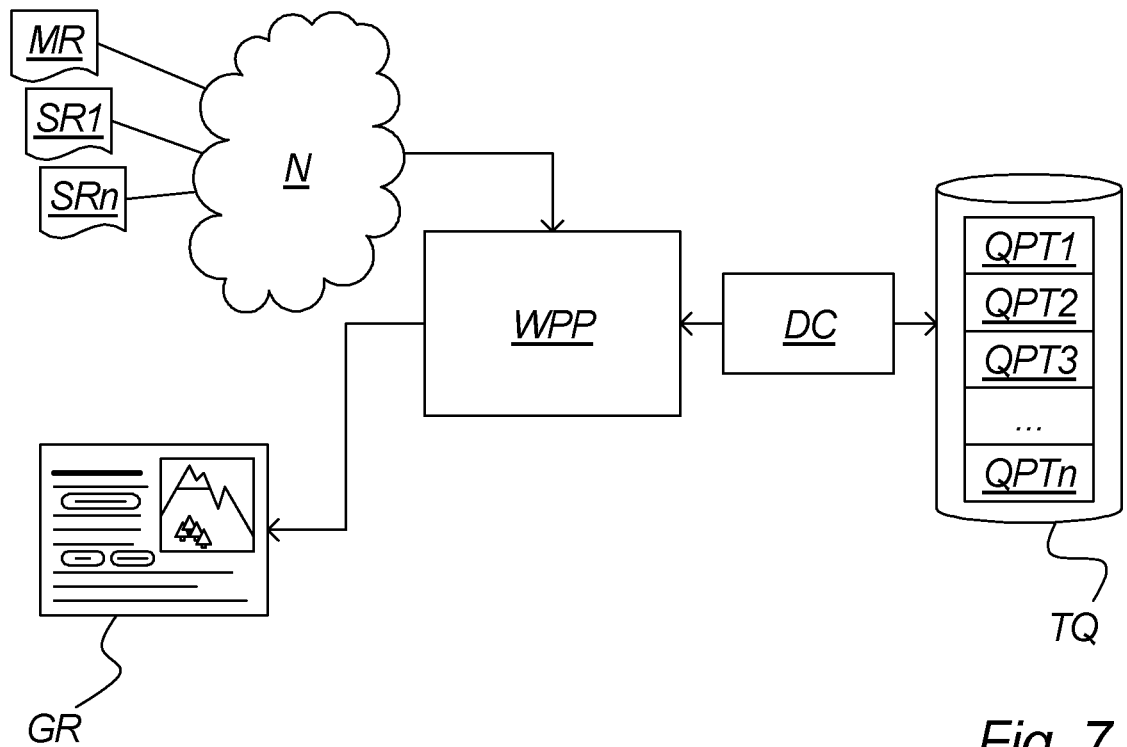

In an embodiment of the invention, the delay converter DC may be implemented in the function which controls the task queue TQ, e.g. creates, monitors and dispatches tasks, for example as illustrated in FIG. 7. Thereby the delay converter is in complete control of the delays, timers, etc., that appear in the browser for a particular webpage, and may for example create tasks with decreased timing information compared to the requested value, and/or decide to dispatch tasks an absolute, relative or proportional time before they we actually set to be dispatched.

In a preferred embodiment of the invention, the delay converter DC may comprise logic to manage that at least some of the tasks are executed in the order in which they apparently may have been designed to by the web page designer. This may e.g. be achieved by the delay converter DC maintaining a list of original and converted timing information, and applying new timing values with increasing delay values in correspondence with the list, and/or, if in control of the task queue, ordering queued tasks in accordance with their original timing information.

The delay converter DC according to the invention may be implemented as a part of a browser e.g. natively or as a plugin, or it may be an external feature communicating with the browser which is processing the web page.

The delay conversion according to the presently disclosed inventive concept(s) is particularly useful when browsing web pages by means of a web robot, to which the delays, which are mostly utilized by web designers to provide a special user experience, are irrelevant at most, but often even detrimental to the effectiveness of the web robot and quality of retrieved content.

Combinations

Figure 8:
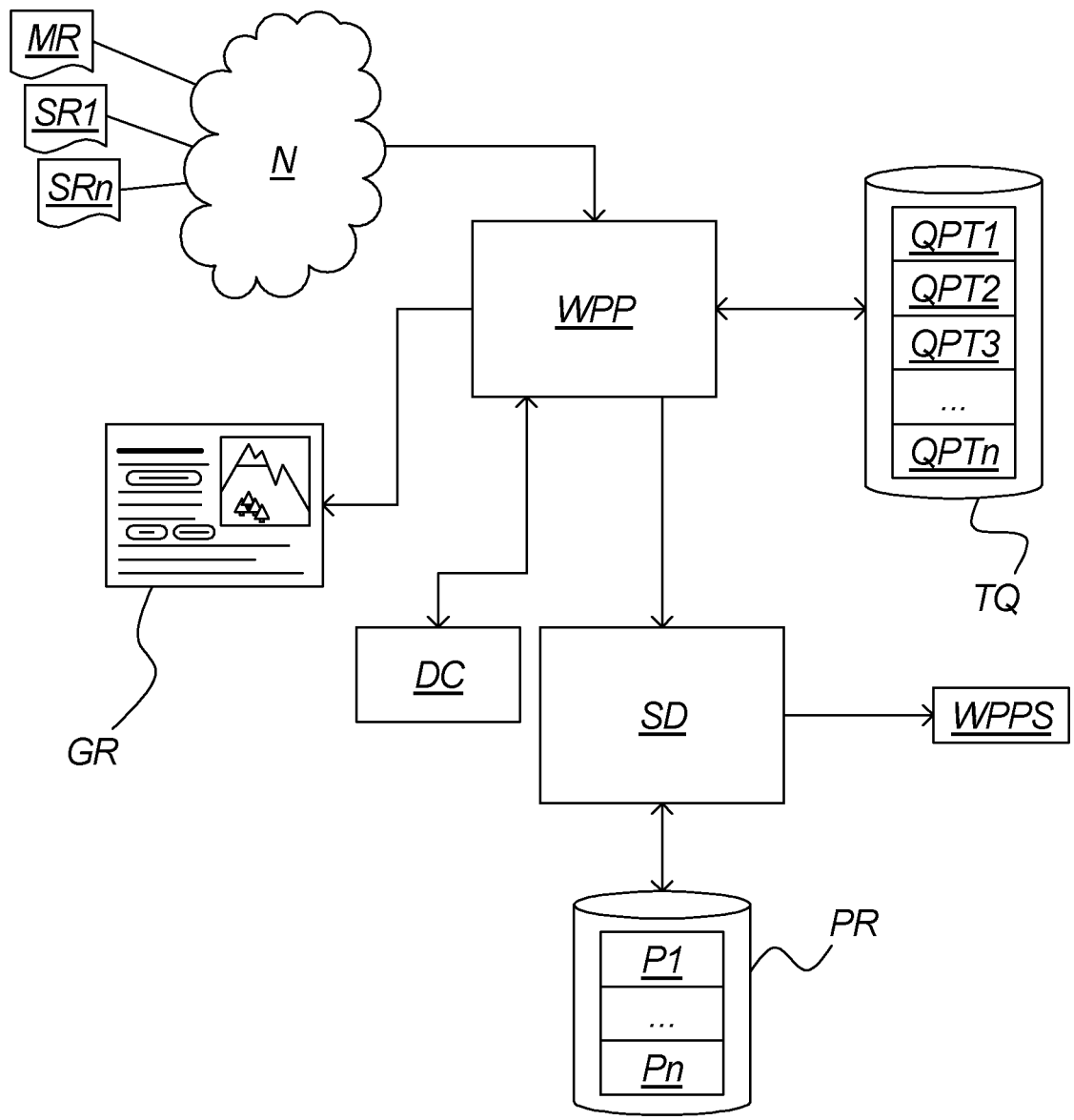
FIGS. 8 to 10 illustrate embodiments of the presently disclosed inventive concepts with combinations of a state determiner and a delay converter.
Figure 9:
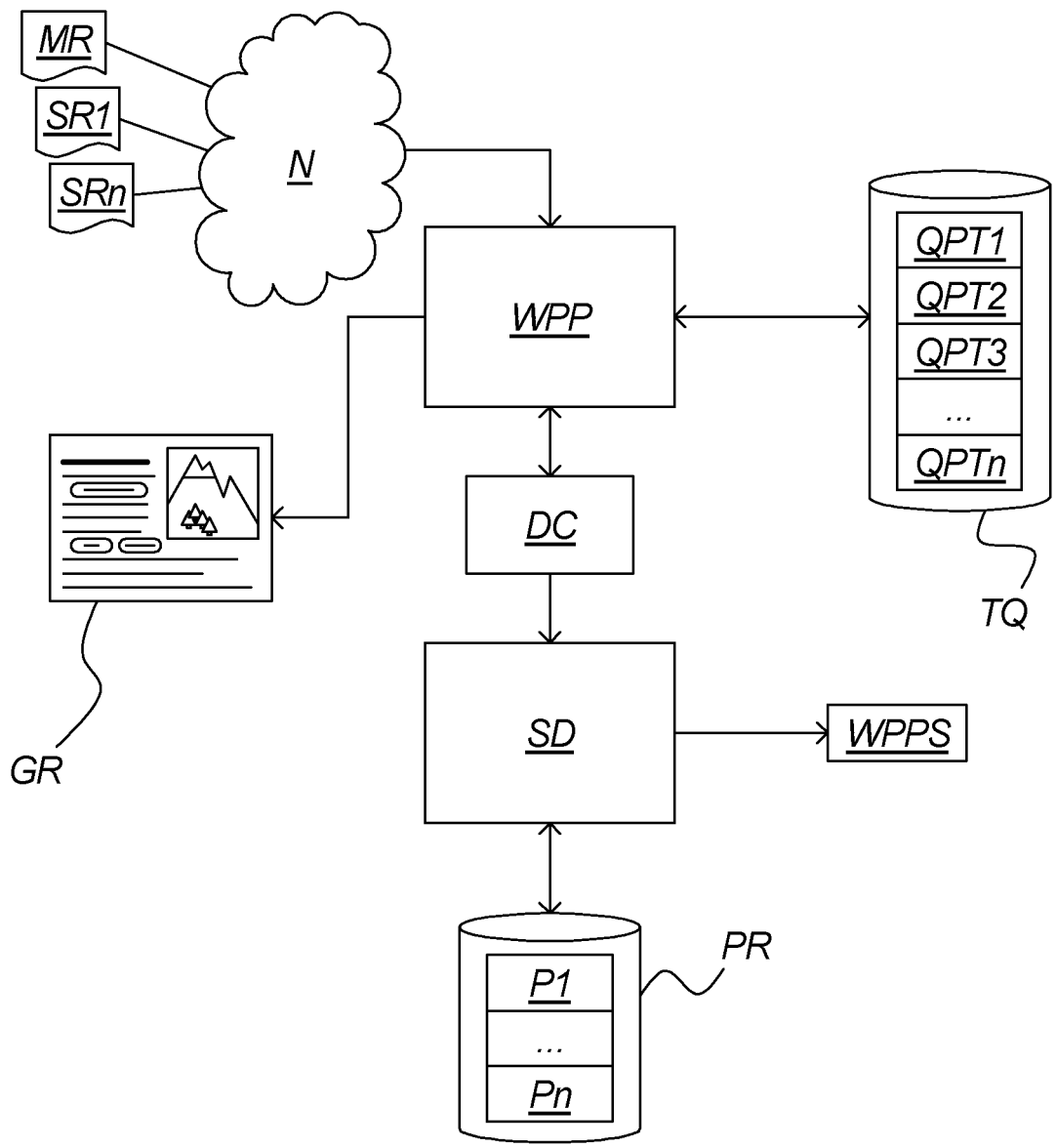
Figure 10:
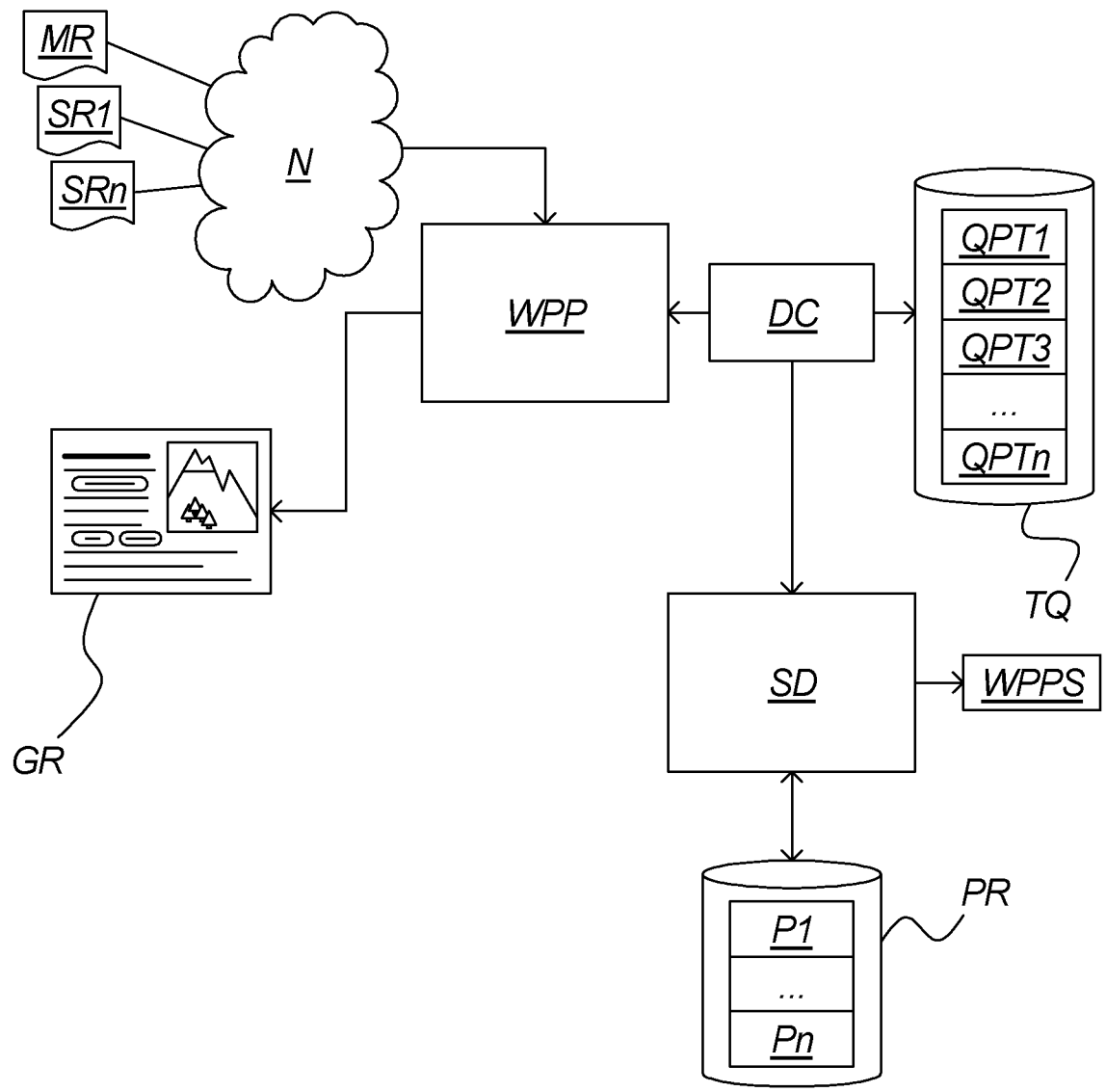

In a preferred embodiment of the invention, one or more of the above-described embodiments regarding determining when the web page processing is complete or at least far enough to interact with the web page is combined with one or more of the above-described embodiments regarding speeding up delays, timers, etc. of a web page. A few examples of embodiments of combinations according to the invention are illustrated in FIGS. 8-10. In FIG. 8 both a state determiner SD and a delay converter DC are arranged in connection with the web page processor WPP, either as part of the browser, a plugin, or at least in communication with the web page processor. The instrumentation of the browser to trace events is preferably implemented in such a way that the delay converter DC converts timing information before the state determiner SD has its parameters updated, in order to register the converted timing information in the parameter register PR. Alternatively, the delay converter may convert timing values in both the task queue and in the parameter register.

In FIG. 9 is illustrated an embodiment where the delay converter DC is located between the web page processor WPP and the state determiner SD to have the delay converter control delays and advice the state determiner of all relevant events, including information about converted timing. In FIG. 10 is illustrated an embodiment where the delay converter DC is arranged to manage the task queue, and thereby being able to consistently maintain the same values in a state determiner SD connected to the delay converter. Another preferred embodiment of the presently disclosed inventive concept(s) comprises the embodiment described above with reference to FIG. 11, combined with a delay converter DC, e.g. as described above with reference to FIG. 6.

As mentioned above, the delay conversion according to the presently disclosed inventive concept(s) is useful when browsing by means of a web robot for more effective content retrieval. However, by combining the delay conversion of the presently disclosed inventive concept(s) with the web page processing state of the presently disclosed inventive concept(s), a highly advantageous robot-friendly browsing is obtained, as the delay converter works towards reducing all waiting as much as possible, and the state determiner is arranged to signal as soon as it is regarded safe for the web robot to proceed. A preferred embodiment may combine the embodiment of web robot browsing described above with reference to FIG. 5, with a delay converter DC as described above with reference to e.g. FIG. 6.

Figure 12:
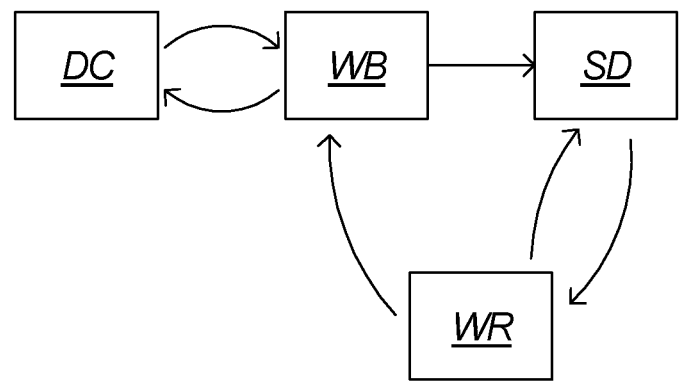
FIG. 12 illustrates one embodiment of interaction between a browser and a web robot according to the presently disclosed inventive concepts.

A preferred embodiment of the invention is illustrated in FIG. 12, where a web robot WR requests a web page from a browser WB. The browser interacts with a delay converter DC, e.g. according to any of the embodiments described above, in order to minimize the processing and loading time of the web page. The browser further sets parameters in a state determiner SD, e.g. according to any of the embodiments described above, to facilitate the state determiner in determining a relevant web page processing state. The web robot interacts with the state determiner in order to monitor the web page processing state and/or be notified when a desired state is obtained, so that the web robot can proceed with the next task, for example requesting a new web page from the web browser, or interacting with the present web page. It is noted that interaction with a web page may also within the scope of the invention cause processing that can be optimized by the delay converter DC and monitored by the state determiner SD, even though it technically may not require a reload of the web page. Any embodiments described above with reference to the browser WB, the state determiner SD, the delay converter DC or the web robot WR, or any related components, may be combined with the embodiment of FIG. 12 within the scope of the invention.

A method may include: setting one or more parameters (P1 . . . Pn) in a state determiner (SD), each of the one or more parameters being based at least in part on one or more predefined processing events related to one or more queued processing tasks (QPT); determining a web page processing state (WPPS) of a browser (WB) based at least in part on the one or more parameters (P1 . . . Pn) in accordance with one or more predefined criteria; tracing said one or more predefined processing events; setting the one or more parameters in the state determiner may be performed in accordance with a predefined processing event occurrence together with related object information; enabling a web robot (WR) to be communicatively coupled said web page processing state (WPPS); reducing one or more delays associated with one or more of the one or more queued processing tasks (QPT), wherein said determining said web page processing state (WPPS) on the basis of said one or more parameters (P1 . . . Pn); considering the relevance to the web page processing state of predefined processing events related to queued processing tasks represented by one or more of the parameters. Additionally and/or alternatively, the method may include a web robot (WR) requesting a browser (WB) to process a web page; setting parameters (P1 . . . Pn) in a state determiner (SD) on the basis of predefined processing events related to queued processing tasks (QPT) established during the browser's processing of the web page; the state determiner (SD) determining a web page processing state (WPPS) on the basis of said parameters (P1 . . . Pn) in accordance with one or more predefined criteria; and the web robot retrieving said information after finding that the web page processing state (WPPS) has reached a predetermined completion value; and reducing one or more delays associated with one or more of the queued processing tasks. Additionally and/or alternatively, the method may include, during a processing of a web page by means of a browser (WB), reducing a time that the start of execution of a queued processing task (QPT) may include set to be delayed by the source code of the web page. Reducing the time may be performed by a delay converter (DC) in relation to the creation of the queued processing task (QPT). The method may include tracing predefined processing events that may cause creation of queued processing tasks (QPT) with associated delays, and invoking a delay converter (DC) to change the delays by one or more of absolute decrements, relative decrements and proportional decrements. The method may include: managing reduced delay times of two or more queued processing tasks so that they may be executed in the same order as defined by the source code of the web page.

A system may include: a task queue (TQ) configured to store one or more queued processing tasks (QPT) during processing of a web page using a browser (WB); a state determiner (SD) may include a parameter register (PR) configured to store one or more parameters (P1 . . . Pn) associated with one or more of said queued processing tasks (QPT); one or more predefined criteria; and a web page processing state (WPPS) determined by said state determiner (SD) on the basis of said one or more parameters (P1 . . . Pn) in accordance with at least one of said one or more criteria. The browser (WB) may include instrumentation configured to trace predefined processing events related to said queued processing tasks (QPT). The parameters may be associated with occurrences predefined processing events related to said queued processing tasks together with related object information. The system may be configured to enable a web robot (WR) to be communicatively coupled to said web page processing state (WPPS). The system may also include a delay converter (DC) configured to reduce one or more delays associated with one or more of the queued processing tasks. The system may additionally and/or alternatively include: a web robot (WR) arranged to retrieve information by means of a browser (WB); a task queue (TQ) for storing one or more queued processing tasks (QPT) during processing of a web page requested from the browser by the web robot; a state determiner (SD) may include a parameter register (PR) for storing one or more parameters (P1 . . . Pn) associated with one or more of said queued processing tasks (QPT); one or more predefined criteria; a web page processing state (WPPS) determined by said state determiner (SD) on the basis of said one or more parameters (P1 . . . Pn) in accordance with at least one of said one or more criteria; the web page processing state (WPPS) indicating whether the web robot should retrieve the information from the web page. The system further may include a delay converter (DC) for reducing one or more delays associated with one or more of the queued processing tasks. The browser (WB) configured to process a web page may include: a task queue (TQ) configured to store one or more queued processing tasks (QPT) during processing of a web page; a state determiner (SD) may include a parameter register (PR) configured to store one or more parameters (P1 . . . Pn) associated with one or more of said queued processing tasks (QPT); one or more predefined criteria; and a web page processing state (WPPS) determined by said state determiner (SD) on the basis of said one or more parameters (P1 . . . Pn) in accordance with at least one of said one or more criteria. The state determiner configured to determine a web page processing state (WPPS); the state determiner (SD) may include: a parameter register (PR) configured to store one or more parameters (P1 . . . Pn) associated with one or more queued processing tasks (QPT) related to a processing of a web page by means of a browser (WB); one or more predefined criteria; and a web page processing state (WPPS) determined on the basis of said one or more parameters (P1 . . . Pn) in accordance with at least one of said one or more criteria. The system may include a task queue (TQ) configured to store one or more queued processing tasks (QPT), at least one of which associated with a time that the start of execution of the queued processing task (QPT) may be set to be delayed by the source code of the web page; and a delay converter (DC) configured to reduce said time that the start of execution of the queued processing task may include set to be delayed. The browser (WB) may include instrumentation for tracing predefined processing events related to said queued processing tasks (QPT).

A computer program product may include computer readable instructions for execution by a computer for determining a web page processing state (WPPS) of a browser (WB). The computer may include at least a processing unit, a memory unit and network connectivity. The computer readable instructions may include: first computer readable instructions which when executed causes setting of parameters (P1 . . . Pn) in a state determiner (SD) on the basis of predefined processing events related to queued processing tasks (QPT); and second computer readable instructions which when executed causes the state determiner (SD) to determine said web page processing state (WPPS) on the basis of said parameters (P1 . . . Pn) in accordance with one or more predefined criteria.

Queued processing tasks (QPT) may include one or more of: timer tasks, asynchronous XMLHttpRequest tasks, scheduled redirection tasks, cascading style sheet transition tasks, queued script tasks, and deferred event task(s). At least one criterion among one or more predefined criteria may be used to evaluate one or more parameters; and said one or more predefined criteria may include one or more of: an existence of one or more further queued tasks; a number of the further queued tasks exceeding a threshold; a length of a chain of timer events, XMLHttpRequests or other asynchronous tasks exceeding a threshold; a duration of no response since dispatch of an XMLHttpRequest exceeding a timeout value; a time scheduled for a redirect or refresh of the web page exceeding a threshold; a number of repetitions of an interval timer exceeding a threshold; and a time set for a timer event exceeding a threshold.

It is noted that any combination, modification, permutation, synthesis, etc. of the above-mentioned embodiments is within the scope of the invention, as described above in the Summary. The scope of the presently disclosed inventive concepts is not to be restricted in any manner based on the foregoing illustrative descriptions, but is instead defined by the following claims.

The invention claimed is:

1. A method, comprising:
setting one or more parameters (P1 . . . Pn) in a state determiner (SD), each of the one or more parameters being based at least in part on one or more predefined processing events related to one or more queued processing tasks (QPT);
determining a web page processing state (WPPS) of a browser (WB) based at least in part on the one or more parameters (P1 . . . Pn) in accordance with one or more predefined criteria;
communicatively coupling a web robot (WR) to the web page processing state (WPPS); and
during processing of a web page by means of the browser (WB):
tracing predefined processing events that are configured to cause creation of queued processing tasks (QPT) with associated delays;
invoking a delay converter (DC) to change the delays by one or more of absolute decrements, relative decrements and proportional decrements; and
reducing a time that the start of execution of the one or more queued processing tasks (QPT) are set to be delayed by the source code of the web page.

2. The method according to claim 1, wherein the setting the one or more parameters in the state determiner is performed in accordance with:
a predefined processing event occurrence; and
object information related to the predefined processing event occurrence.

3. The method according to claim 1, wherein the one or more queued processing tasks (QPT) comprise one or more of:
one or more timer tasks,
one or more asynchronous XMLHttpRequest tasks, one or more scheduled redirection tasks,
one or more cascading style sheet transition tasks, one or more queued script tasks, and one or more deferred event tasks.

4. The method according to claim 1, wherein at least one criterion among the one or more predefined criteria is used to evaluate at least one of the one or more parameters.

5. The method according to claim 1, wherein the predefined criteria comprise one or more of:
an existence of one or more further queued tasks; a number of the further queued tasks exceeding a threshold: a length of a chain of timer events, XMLHttpRequests or other asynchronous tasks exceeding a threshold;
a duration of no response since dispatch of an XMLHttpRequest exceeding a timeout value;
a time scheduled for a redirect or refresh of the web page exceeding a threshold;
a number of repetitions of an interval timer exceeding a threshold; and a time set for a timer event exceeding a threshold.

6. The method according to claim 1, further comprising:
requesting the browser (WB) to process a web page, the request being submitted using a web robot (WR), wherein the queued processing tasks (QPT) are established during the browser's (WB) processing of the web page; and
retrieving the information after finding that the web page processing state (WPPS) has reached a predetermined completion value, the retrieving being performed at least partially using the web robot; and
wherein determining the web page processing state (WPPS) of the browser (WB) is performed at least partially using the state determiner (SD).

7. The method according to claim 6, further comprising: reducing one or more delays associated with one or more of the queued processing tasks.

8. A computer program product, comprising a non-transitory computer readable medium having computer readable instructions embodied therewith, the computer readable instructions being configured to cause a computer, upon execution thereof, to: set, using a processing unit of the computer, one or more parameters (P1 . . . Pn) in a state determiner (SD), each of the one or more parameters being based at least in part on one or more predefined processing events related to one or more queued processing tasks (QPT);
determine, using the processing unit, a web page processing state (WPPS) of a browser (WB) based at least in part on the one or more parameters (P1 . . . Pn) in accordance with one or more predefined criteria;
communicatively couple a web robot (WR) to the web page processing state (WPPS); and
during processing of a web page by means of the browser (WB):
trace, using the processing unit, predefined processing events that are configured to cause creation of queued processing tasks (QPT) with associated delays;
invoke, using the processing unit, a delay converter (DC) to change the delays by one or more of absolute decrements, relative decrements and proportional decrements; and
reduce, using the processing unit, a time that the start of execution of the one or more queued processing tasks (OPT) are set to be delayed by the source code of the web page.

9. The computer program product according to claim 8, wherein the computer readable program instructions configured to cause the computer, upon execution thereof, to set the one or more parameters in the state determiner are further configured to cause the computer to set the one or more parameters in accordance with:
a predefined processing event occurrence; and
object information related to the predefined processing event occurrence.

10. The computer program product according to claim 8, wherein the queued processing tasks (OPT) comprise one or more of:
one or more timer tasks,
one or more asynchronous XMLHttpRequest tasks, one or more scheduled redirection tasks,
one or more cascading style sheet transition tasks, one or more queued script tasks, and one or more deferred event tasks.

11. The computer program product according to claim 8, wherein at least one criterion among the one or more predefined criteria is used to evaluate one or more of the one or more parameters.

12. The computer program product according to claim 8, wherein the one or more predefined criteria comprise one or more of:
an existence of one or more further queued tasks; a number of the further queued tasks exceeding a threshold; a length of a chain of timer events, XMLHttpRequests or other asynchronous tasks exceeding a threshold;
a duration of no response since dispatch of an XMLHttpRequest exceeding a timeout value;
a time scheduled for a redirect or refresh of the web page exceeding a threshold; a number of repetitions of an interval timer exceeding a threshold; and a time set for a timer event exceeding a threshold.

13. The computer program product according to claim 8, further comprising computer readable instructions configured to cause the computer, upon execution thereof, to:
request the browser (WB) to process a web page, the request being submitted using a web robot (WR), wherein the queued processing tasks (QPT) are established during the browser's (WB) processing of the web page; and
retrieve the information after finding that the web page processing state (WPPS) has reached a predetermined completion value, the retrieving being performed at least partially using the web robot; and
wherein determining the web page processing state (WPPS) of the browser (WB) is performed at least partially using the state determiner (SD).

14. The computer program product according to claim 13, further comprising computer readable instructions configured to cause the computer, upon execution thereof, to: reduce one or more delays associated with one or more of the queued processing tasks.

15. A system includes:
a processing unit; and
a memory unit, the memory unit comprising computer readable instructions configured to cause the system, upon execution thereof, to:
set one or more parameters in a state determiner, each of the one or more parameters being based at least in part on one or more predefined processing events related to one or more queued processing tasks;
determine a web page processing state of a browser based at least in part on the one or more parameters in accordance with one or more predefined criteria;
communicatively couple a web robot (WR) to the web page processing state (WPPS); and
during processing of a web page by means of the browser:
trace predefined processing events that are configured to cause creation of queued processing tasks (OPT) with associated delays;
invoke a delay converter (DC) to change the delays by one or more of absolute decrements, relative decrements and proportional decrements; and
reduce a time that the start of execution of the one or more queued processing tasks are set to be delayed by a source code of the web page.

16. The system according to claim 15, wherein the computer readable instructions configured to cause the computer, upon execution thereof, to set the one or more parameters in the state determiner are further configured to cause the computer to set the one or more parameters in accordance with: a predefined processing event occurrence; and
object information related to the predefined processing event occurrence.

17. The system according to claim 15, wherein the memory unit further comprises computer readable instructions configured to cause the computer, upon execution thereof, to: reduce one or more delays associated with one or more of the queued processing tasks.

* * * * *

UNITED STATES PATENT AND TRADEMARK OFFICE
CERTIFICATE OF CORRECTION

PATENT NO. : 10,540,417 B2
APPLICATION NO. : 16/434055
DATED : January 21, 2020
INVENTOR(S) : Benjamin De Coninck Owe Page 1 of 1

It is certified that error appears in the above-identified patent and that said Letters Patent is hereby corrected as shown below:

In the Specification

Column no. 28, Line no. 35, please replace "queued processing tasks QPT1 QPTn." with --queued processing tasks QPT1 … QPTn.--.

In the Claims

Column no. 34, Line no. 1, please replace "old: a length of a chain of" with --old; a length of a chain of--;

Column no. 34, Line no. 55, please replace "tasks (OPT) are set" with --tasks (QPT) are set--;

Column no. 35, Line no. 2, please replace "processing tasks (OPT) comprise" with --processing tasks (QPT) comprise--;

Column no. 36, Line no. 22, please replace "queued processing tasks (OPT)" with --queued processing tasks (QPT)--.

Signed and Sealed this
Sixteenth Day of June, 2020

Andrei Iancu
*Director of the United States Patent and Trademark Office*